(12) United States Patent
Ogink et al.

(10) Patent No.: US 12,402,749 B2
(45) Date of Patent: *Sep. 2, 2025

(54) SYSTEM, APPARATUS, METHOD, CAPSULE AND KIT OF CAPSULES FOR PREPARING A BEVERAGE

(71) Applicant: Koninklijke Douwe Egberts B.V., Utrecht (NL)

(72) Inventors: Judith Margreet Hanneke Ogink, Putten (NL); Marjan Cornelissen, Drachten (NL); Peter Rijskamp, Gaggio Montano (IT); Klaas Kooijker, Drachten (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 777 days.

This patent is subject to a terminal disclaimer.

(21) Appl. No.: 17/373,264

(22) Filed: Jul. 12, 2021

(65) Prior Publication Data
US 2021/0338002 A1 Nov. 4, 2021

Related U.S. Application Data

(63) Continuation of application No. 16/264,636, filed on Jan. 31, 2019, now Pat. No. 11,096,516, which is a (Continued)

(30) Foreign Application Priority Data

Aug. 3, 2016 (NL) .................................... 2017285

(51) Int. Cl.
*A47J 31/36* (2006.01)
*A47J 31/06* (2006.01)
*B65D 85/804* (2006.01)

(52) U.S. Cl.
CPC ....... *A47J 31/3633* (2013.01); *A47J 31/0647* (2013.01); *B65D 85/8043* (2013.01)

(58) Field of Classification Search
CPC ................ A47J 31/0626; A47J 31/0647; A47J 31/0642; A47J 31/3604; A47J 31/3638;
(Continued)

(56) References Cited

U.S. PATENT DOCUMENTS

| 4,775,048 A | 10/1988 | Baecchi |
| 4,787,299 A | 11/1988 | Levi |

(Continued)

FOREIGN PATENT DOCUMENTS

| AU | 2012356914 | 7/2014 |
| AU | 2013305155 | 3/2015 |

(Continued)

OTHER PUBLICATIONS

International Preliminary Report on Patentability, PCT/NL2017/050509, 7 pages (Feb. 5, 2019).

(Continued)

*Primary Examiner* — Brian W Jennison
(74) *Attorney, Agent, or Firm* — Fitch, Even, Tabin & Flannery LLP

(57) ABSTRACT

A system for preparing a quantity of beverage, including first and second capsules, and an apparatus including a first and a second brew chamber part, wherein at least a portion of the second brew chamber part is movable into a first and a second brewing position, wherein the first brew chamber part is movable between a loading position and a brewing position, wherein the first brew chamber part in the brewing position together with the at least one portion of the second brew chamber part in the first brewing position and in the second position define respective closed positions in which the first exchangeable capsule and the second capsule fit in (Continued)

the brew chamber, respectively. The invention also relates to an apparatus, a method and a capsule.

21 Claims, 13 Drawing Sheets

Related U.S. Application Data continuation of application No. PCT/NL2017/050515, filed on Aug. 3, 2017.

(58) Field of Classification Search
CPC ............... A47J 31/3633; A47J 31/3666; A47J 31/4403; A47J 31/446; A47J 31/4464; A47J 31/4467; A47J 31/4482
USPC .......................................................... 99/295
See application file for complete search history.

(56) References Cited

U.S. PATENT DOCUMENTS

| | | | |
|---|---|---|---|
| 5,197,374 A | 3/1993 | Fond | |
| 5,343,799 A | 9/1994 | Fond | |
| 5,964,142 A | 10/1999 | Tio | |
| 6,026,732 A | 2/2000 | Kollep | |
| 7,216,582 B2 | 5/2007 | Yoakim | |
| 7,337,704 B2 | 3/2008 | Hammad | |
| 7,607,385 B2 | 10/2009 | Halliday | |
| 8,210,096 B2 | 7/2012 | Fin | |
| 8,365,585 B2 | 2/2013 | Barra | |
| 8,770,095 B2 | 7/2014 | Pecci | |
| 8,836,956 B2 | 9/2014 | Jarisch | |
| 8,904,922 B2 | 12/2014 | Pagano | |
| 9,167,934 B2 | 10/2015 | Höglauer | |
| 9,186,018 B2 | 11/2015 | Rotta | |
| 9,439,532 B2 | 9/2016 | Crarer | |
| 9,801,494 B2 | 10/2017 | Castellani | |
| 9,986,869 B2 | 6/2018 | Bonacci | |
| 11,096,516 B2 * | 8/2021 | Ogink | B65D 85/8043 |
| 2001/0011502 A1 | 8/2001 | Bonanno | |
| 2001/0052294 A1 | 12/2001 | Schmed | |
| 2002/0023543 A1 | 2/2002 | Schmed | |
| 2003/0066431 A1 | 4/2003 | Fanzutti | |
| 2004/0197444 A1 | 10/2004 | Halliday | |
| 2005/0223904 A1 | 10/2005 | Laigneau | |
| 2006/0075902 A1 | 4/2006 | Magno | |
| 2006/0107841 A1 | 5/2006 | Schifferle | |
| 2006/0174769 A1 | 8/2006 | Favre | |
| 2006/0266224 A1 | 11/2006 | Hammad | |
| 2008/0006159 A1 | 1/2008 | Fischer | |
| 2008/0245236 A1 | 10/2008 | Ternite | |
| 2010/0064899 A1 | 3/2010 | Aardenburg | |
| 2011/0000377 A1 | 1/2011 | Favre | |
| 2011/0142996 A1 | 6/2011 | Krueger | |
| 2011/0183055 A1 | 7/2011 | Mariller | |
| 2011/0185910 A1 | 8/2011 | Ryser | |
| 2011/0277642 A1 | 11/2011 | Mariller | |
| 2011/0297005 A1 | 12/2011 | Mariller | |
| 2012/0240779 A1 | 9/2012 | Perentes | |
| 2013/0099597 A1 | 4/2013 | Perentes | |
| 2013/0220138 A1 | 8/2013 | Deuber | |
| 2013/0247774 A1 | 9/2013 | Macchiavelli | |
| 2013/0323366 A1 | 12/2013 | Gerbaulet | |
| 2014/0053734 A1 | 2/2014 | Santi | |
| 2014/0227414 A1 | 8/2014 | Perentes | |
| 2014/0263780 A1 | 9/2014 | Day, Jr. | |
| 2014/0290495 A1 | 10/2014 | Perentes | |
| 2014/0299000 A1 | 10/2014 | Hanneson | |
| 2015/0027375 A1 | 1/2015 | Cha | |
| 2015/0059587 A1 | 3/2015 | Colleoni | |
| 2015/0082989 A1 | 3/2015 | Besson | |
| 2015/0104550 A1 | 4/2015 | Oh | |
| 2015/0147448 A1 | 5/2015 | Lo Foro | |
| 2015/0157169 A1 | 6/2015 | Krüger | |
| 2015/0158665 A1 | 6/2015 | Krüger | |
| 2015/0183577 A1 | 7/2015 | Talon | |
| 2015/0225169 A1 | 8/2015 | Jarisch | |
| 2015/0238039 A1 | 8/2015 | Fischer | |
| 2015/0272375 A1 | 10/2015 | Flick | |
| 2015/0272376 A1 | 10/2015 | Flick | |
| 2015/0272380 A1 | 10/2015 | Flick | |
| 2015/0342394 A1 | 12/2015 | Bonacci | |
| 2016/0045060 A1 | 2/2016 | Flick | |
| 2016/0150907 A1 | 6/2016 | Bolognese | |
| 2016/0157666 A1 | 6/2016 | Brandsma | |
| 2016/0309946 A1 | 10/2016 | Gunstone | |
| 2017/0013993 A1 * | 1/2017 | Bonacci | A47J 31/0647 |
| 2017/0143157 A1 | 5/2017 | Tentorio | |
| 2018/0042258 A1 * | 2/2018 | Roberts | A47J 31/0615 |
| 2019/0167031 A1 | 6/2019 | Rijskamp | |
| 2019/0274467 A1 | 9/2019 | Ogink | |
| 2019/0335940 A1 | 11/2019 | Rijskamp | |
| 2019/0335942 A1 | 11/2019 | Rijskamp | |
| 2019/0343324 A1 | 11/2019 | Rijskamp | |
| 2019/0343325 A1 | 11/2019 | Ogink | |
| 2020/0000265 A1 | 1/2020 | Ogink | |
| 2020/0000268 A1 | 1/2020 | Ogink | |
| 2020/0000271 A1 | 1/2020 | Ogink | |

FOREIGN PATENT DOCUMENTS

| | | |
|---|---|---|
| CA | 2765324 | 11/2010 |
| CN | 1232212 | 10/1999 |
| CN | 1612831 | 5/2005 |
| CN | 101123905 | 2/2008 |
| CN | 101389551 | 3/2009 |
| CN | 100480150 | 4/2009 |
| CN | 201481108 | 5/2010 |
| CN | 101795605 | 8/2010 |
| CN | 102188161 | 9/2011 |
| CN | 102245065 | 11/2011 |
| CN | 103002781 | 3/2013 |
| CN | 103124509 | 5/2013 |
| CN | 202960135 | 6/2013 |
| CN | 103829804 | 6/2014 |
| CN | 104244780 | 12/2014 |
| CN | 104884368 | 9/2015 |
| CN | 105431358 | 3/2016 |
| CN | 105813958 | 7/2016 |
| DE | 10334526 | 2/2005 |
| DE | 202007002910 | 5/2007 |
| DE | 102005049624 | 7/2007 |
| DE | 202012005191 | 6/2012 |
| DE | 102012010394 | 11/2013 |
| DE | 202015100812 | 5/2016 |
| DE | 202015100813 | 5/2016 |
| DE | 202015100814 | 5/2016 |
| DE | 202015101266 | 6/2016 |
| EP | 0449533 | 10/1991 |
| EP | 0451980 | 10/1991 |
| EP | 1183975 | 3/2002 |
| EP | 1208782 | 5/2002 |
| EP | 1360919 | 11/2003 |
| EP | 1518484 | 3/2005 |
| EP | 1555219 | 7/2005 |
| EP | 1559351 | 8/2005 |
| EP | 1767129 | 3/2007 |
| EP | 1842467 | 10/2007 |
| EP | 1859713 | 11/2007 |
| EP | 2033551 | 3/2009 |
| EP | 2071986 | 6/2009 |
| EP | 2071987 | 6/2009 |
| EP | 2250950 | 11/2010 |
| EP | 2409608 | 1/2012 |
| EP | 2409609 | 1/2012 |
| EP | 2471420 | 7/2012 |
| EP | 2656755 | 10/2013 |
| EP | 2687133 | 1/2014 |
| JP | H5192246 A | 8/1993 |
| JP | 2006528507 A | 12/2006 |
| JP | 2009531099 A | 9/2009 |
| JP | 2014138892 | 7/2014 |
| JP | 2015506787 A | 3/2015 |
| JP | 2015512739 A | 4/2015 |

(56) References Cited

FOREIGN PATENT DOCUMENTS

| | | |
|---|---|---|
| RU | 2012128493 A | 1/2014 |
| RU | 2591768 C2 | 7/2016 |
| RU | 2626940 | 8/2017 |
| WO | 2000042891 | 7/2000 |
| WO | 0243541 | 6/2002 |
| WO | 2005016092 | 2/2005 |
| WO | 2006005736 | 1/2006 |
| WO | 2006014936 | 2/2006 |
| WO | 2006066625 | 6/2006 |
| WO | 2007012206 | 2/2007 |
| WO | 2007016977 | 2/2007 |
| WO | 2007096196 | 8/2007 |
| WO | 2007113100 | 10/2007 |
| WO | 2007122206 | 11/2007 |
| WO | 2008004116 | 1/2008 |
| WO | 2008096385 | 8/2008 |
| WO | 2009016455 | 2/2009 |
| WO | 2009027131 | 3/2009 |
| WO | 2010013274 | 2/2010 |
| WO | 2010029512 | 3/2010 |
| WO | 2010076698 | 7/2010 |
| WO | 2010134054 | 11/2010 |
| WO | 2010137953 | 12/2010 |
| WO | 2010137954 | 12/2010 |
| WO | 2010137956 | 12/2010 |
| WO | 2011015978 | 2/2011 |
| WO | 2011042401 | 4/2011 |
| WO | 2011069829 | 6/2011 |
| WO | 2011069830 | 6/2011 |
| WO | 2011073310 | 6/2011 |
| WO | 2011076750 | 6/2011 |
| WO | 2011113854 A2 | 9/2011 |
| WO | 2011121125 | 10/2011 |
| WO | 2012001115 | 1/2012 |
| WO | 2012123440 | 9/2012 |
| WO | 2012156167 | 11/2012 |
| WO | 2013007776 | 1/2013 |
| WO | 2013008012 | 1/2013 |
| WO | 2013079814 | 6/2013 |
| WO | 2013092910 | 6/2013 |
| WO | 2013119543 | 8/2013 |
| WO | 2013144922 | 10/2013 |
| WO | 2014012778 | 1/2014 |
| WO | 2014012779 | 1/2014 |
| WO | 2014016741 | 1/2014 |
| WO | WO-2014016741 A2 * | 1/2014 ............ A23F 5/26 |
| WO | 2014027079 | 2/2014 |
| WO | 2014029685 | 2/2014 |
| WO | 2014041605 | 3/2014 |
| WO | 2014056641 | 4/2014 |
| WO | 2014056642 | 4/2014 |
| WO | 2014056730 | 4/2014 |
| WO | 2014056810 | 4/2014 |
| WO | 2014056821 | 4/2014 |
| WO | 2014056862 | 4/2014 |
| WO | 2014060370 | 4/2014 |
| WO | 2014082975 | 6/2014 |
| WO | 2014082976 | 6/2014 |
| WO | 2014092406 | 6/2014 |
| WO | 2014096120 | 6/2014 |
| WO | 2014096121 | 6/2014 |
| WO | 2014132158 | 9/2014 |
| WO | 2014174462 | 10/2014 |
| WO | 2014183219 | 11/2014 |
| WO | 2014183783 | 11/2014 |
| WO | 2015004613 | 1/2015 |
| WO | 2015056022 | 4/2015 |
| WO | 2015082662 | 6/2015 |
| WO | 2015082663 | 6/2015 |
| WO | 2015082664 | 6/2015 |
| WO | 2015086371 | 6/2015 |
| WO | 2015109052 | 7/2015 |
| WO | 2015124627 | 8/2015 |
| WO | 2015144356 | 10/2015 |
| WO | 2015155145 | 10/2015 |
| WO | 2015158838 | 10/2015 |
| WO | 2015173123 | 11/2015 |
| WO | 2015193744 | 12/2015 |
| WO | 2016012562 | 1/2016 |
| WO | 2016055633 | 4/2016 |
| WO | 2016071795 | 5/2016 |
| WO | 2016082029 | 6/2016 |

OTHER PUBLICATIONS

International Preliminary Report on Patentability, PCT/NL2017/050510, 7 pages (Feb. 5, 2019).
International Preliminary Report on Patentability, PCT/NL2017/050511, 7 pages (Feb. 5, 2019).
International Preliminary Report on Patentability, PCT/NL2017/050512, 6 pages (Feb. 5, 2019).
International Preliminary Report on Patentability, PCT/NL2017/050513, 6 pages (Feb. 5, 2019).
International Preliminary Report on Patentability, PCT/NL2017/050514, 6 pages (Feb. 5, 2019).
International Preliminary Report on Patentability, PCT/NL2017/050515, 6 pages (Feb. 5, 2019).
International Preliminary Report on Patentability, PCT/NL2017/050519, 9 pages (Feb. 5, 2019).
International Preliminary Report on Patentability, PCT/NL2017/050521, 5 pages (Feb. 5, 2019).
International Preliminary Report on Patentability, PCT/NL2017/050522, 12 pages (Feb. 5, 2019).
International Search Report and Written Opinion, PCT/NL2017/050509, 11 pages (Jun. 5, 2018).
International Search Report and Written Opinion, PCT/NL2017/050510, 10 pages (Nov. 20, 2017).
International Search Report and Written Opinion, PCT/NL2017/050511, 9 pages (Nov. 30, 2017).
International Search Report and Written Opinion, PCT/NL2017/050512, 10 pages (Nov. 27, 2017).
International Search Report and Written Opinion, PCT/NL2017/050513, 8 pages (Dec. 22, 2017).
International Search Report and Written Opinion, PCT/NL2017/050514, 8 pages (Nov. 23, 2017).
International Search Report and Written Opinion, PCT/NL2017/050515, 10 pages (Nov. 27, 2017).
International Search Report and Written Opinion, PCT/NL2017/050519, 11 pages (Nov. 29, 2017).
International Search Report and Written Opinion, PCT/NL2017/050521, 8 pages (Dec. 4, 2017).
International Search Report and Written Opinion, PCT/NL2017/050522, 17 pages (Jan. 17, 2018).
Manual Jura Nespresso English, 22 pages.
Nespresso-I, 8 pages.
Nespresso-II, 2 pages (2003).
Nespresso-III, 2 pages (2003).
Nespresso-IV, 7 pages.
Nespresso-V, 5 pages (Apr. 2015).

* cited by examiner

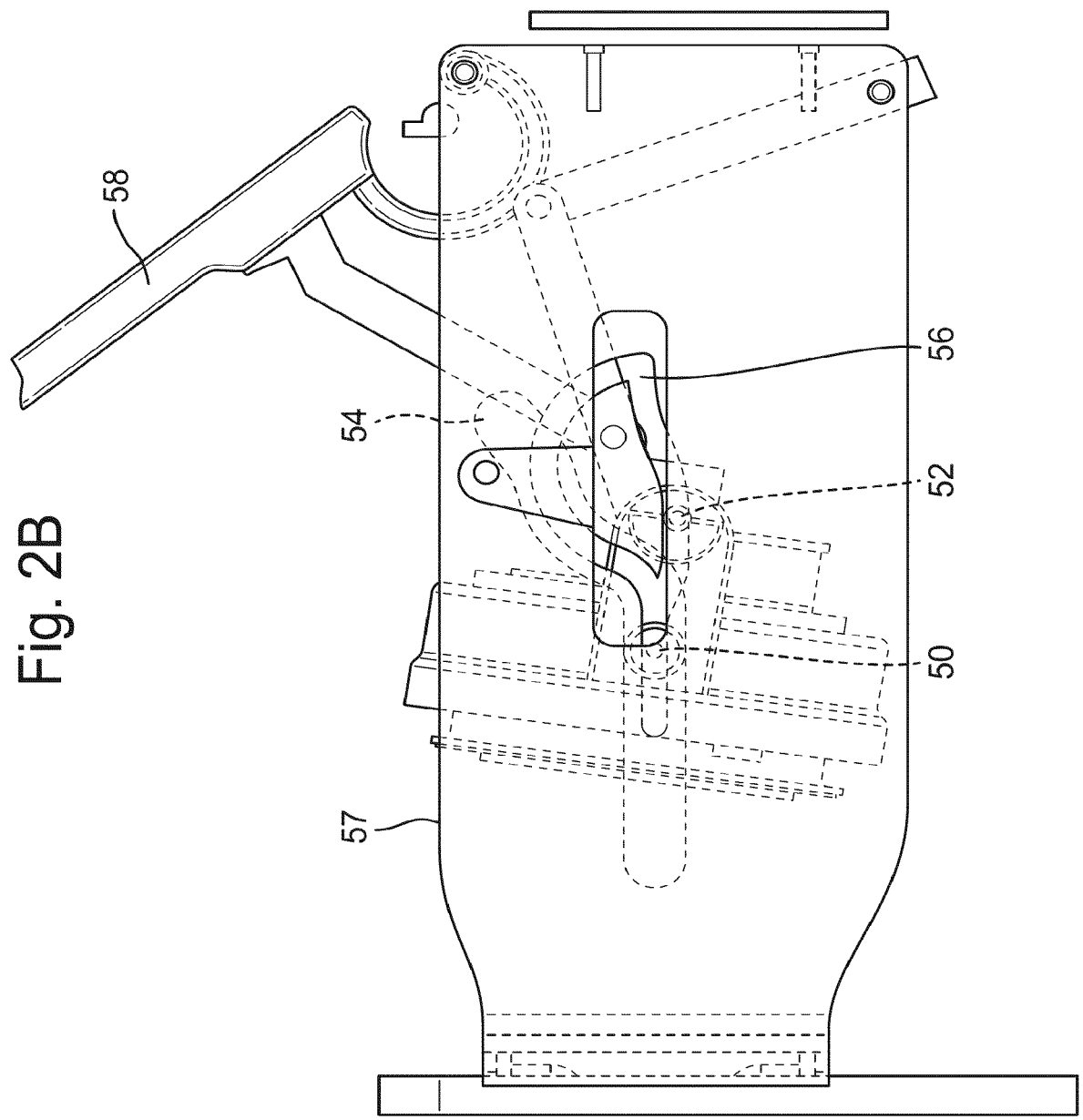

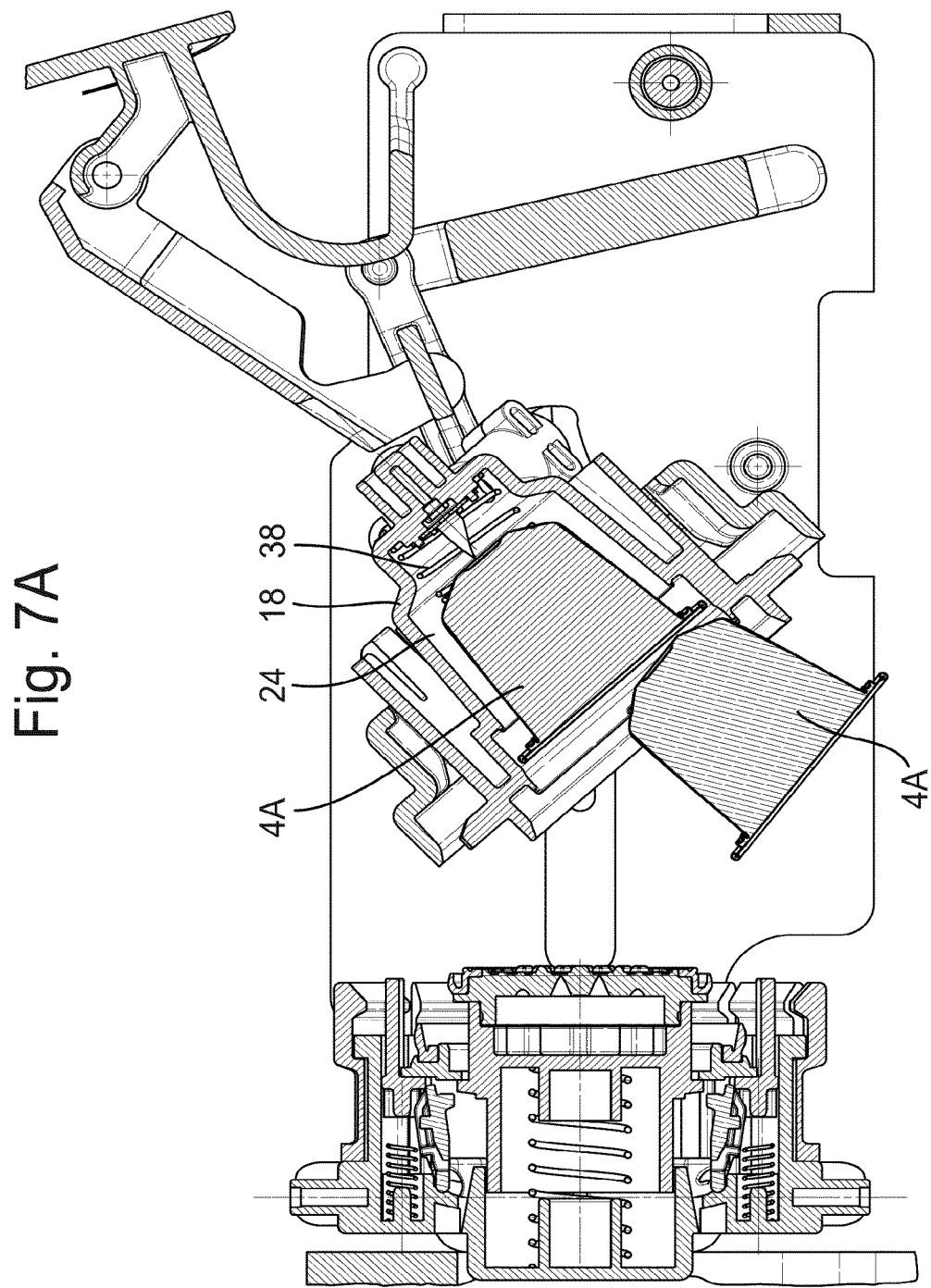

SYSTEM, APPARATUS, METHOD, CAPSULE AND KIT OF CAPSULES FOR PREPARING A BEVERAGE

CROSS-REFERENCE TO RELATED APPLICATIONS

This application is a continuation of U.S. patent application Ser. No. 16/264,636 filed Jan. 31, 2019, which in a continuation of PCT/NL2017/050515 filed Aug. 3, 2017, which claims the benefit of and priority to Netherlands Patent Application No. NL 2017285 filed Aug. 3, 2016, the entire contents of each of which are hereby incorporated herein by reference.

BACKGROUND

The invention generally relates to a system for preparing a beverage. Here the invention also relates to an apparatus and method for preparing a beverage. Further the invention relates to a capsule, a kit of capsules and the use of a capsule for preparing a beverage. More specifically the invention relates to a system for preparing a beverage using a capsule.

Apparatus and systems for preparing a beverage, especially by use of a capsule comprising a beverage preparation product, like ground coffee etc., are known from the state of the art. Normally a capsule is adapted to a respective apparatus and can be arranged within a brewing chamber of this apparatus so that a fluid for beverage preparation can be introduced to the capsule. After a specific brewing process a prepared beverage can be discharged for consumption.

It's a drawback of such systems that the range of beverages which can be prepared is limited. It is basic knowledge that for preparation of an espresso a different beverage preparation product and process is necessary than when a normal coffee, coffee Americano etc. is indented to be prepared. Although there are capsules known from the art comprising different kinds of beverage preparation products, for example ground coffee, soluble coffee powder, milk powder etc., the range of different beverages to be prepared is limited. These capsules known from the art are called "first exchangeable capsules" in the following.

There are systems and apparatuses etc. known from the art that allow use of different sized capsules, namely of the first exchangeable capsule and further of at least a second exchangeable capsule, which can be selectively provided with the apparatus.

WO 2015/004613 A1 for example discloses an apparatus where capsules having different sizes can be introduced for that purpose. The apparatus comprises a variable-volume brewing chamber, wherein its volume can be adapted to the capsule introduced. For that purpose, the brewing chamber comprises a moveable delimiting bottom part allowing increasing and decreasing the axial length of the cavity of the brewing chamber so that different kind of capsules can be introduced therein. The technical arrangement of this brewing chamber is however quite complicated, wherein especially alignment of the capsule within the brewing chamber cannot reliably be guaranteed especially under pressurized conditions. Further adaption of the different sizes of the brewing chamber is error-prone resulting in deviations of the quality of the prepared beverage.

In the light of the above a need exist to provide a beverage preparation apparatus arranged for use with different sized capsules providing a reliable long-term beverage preparation with a repeatable unchanged beverage quality.

SUMMARY

The above object is solved by the matter of the inventions disclosed herein.

In detail, the object is solved by a system for preparing a quantity of beverage suitable for consumption, including an optional first exchangeable capsule and a second exchangeable capsule, the second exchangeable capsule being different from the first exchangeable capsule, and an apparatus including a first brew chamber part and a second brew chamber part forming a brew chamber for selectively holding one of the first and second exchangeable capsules, and a fluid supply system for supplying an amount of fluid, such as water, under pressure to the first brew chamber part, wherein at least a portion of the second brew chamber part is movable into a first brewing position and a second brewing position, wherein the first brew chamber part is movable between a loading position and a brewing position, wherein the first brew chamber part in the loading position together with the second brew chamber part defines an open position in which the capsule can be inserted into the brew chamber, wherein the first brew chamber part in the brewing position together with the at least one portion of the second brew chamber part in the first brewing position defines a closed position in which the first exchangeable capsule fits in the brew chamber, and wherein the first brew chamber part in the brewing position together with the at least one portion of the second brew chamber part in the second brewing position defines a closed position in which the second exchangeable capsule fits in the brew chamber.

The object is further solved by an apparatus for preparing a quantity of beverage suitable for consumption, including a first brew chamber part and a second brew chamber part forming a brew chamber for selectively holding one of a first and a second exchangeable capsules, and a fluid supply system for supplying an amount of fluid, such as water, under pressure to the first brew chamber part, wherein at least a portion of the second brew chamber part is movable into a first brewing position and a second brewing position, wherein the first brew chamber part is movable between a loading position and a brewing position, wherein the first brew chamber part in the loading position together with the second brew chamber part defines an open position in which the capsule can be inserted into the brew chamber, wherein the first brew chamber part in the brewing position together with the at least one portion of the second brew chamber part in the first brewing position defines a closed position in which the first exchangeable capsule fits in the brew chamber, and wherein the first brew chamber part in the brewing position together with the at least one portion of the second brew chamber part in the second brewing position defines a closed position in which the second exchangeable capsule fits in the brew chamber.

Also the object is solved by the use of a second exchangeable capsule for preparing a quantity of beverage suitable for consumption in a system and/or in an apparatus as defined herein, the second exchangeable capsule comprising a beverage preparation product and having a second body and a second exit face attached to the second body, the diameter of the exit face of said second exchangeable capsule being larger than the diameter of an exit face of a first exchangeable capsule, the first exchangeable capsule comprising a beverage preparation product and having a first body and a first exit face attached to the first body, the second exchangeable capsule being arranged for moving the at least one portion and especially a central portion from a ready position to a second brewing position.

The object is also solved by a second exchangeable capsule of the system as defined herein, the second exchangeable capsule comprising a beverage preparation product and having a second body and a second exit face attached to the second body, the diameter of the exit face of said second exchangeable capsule being larger than the diameter of an exit face of a first exchangeable capsule, the first exchangeable capsule comprising a beverage preparation product and having a first body and a first exit face attached to the first body, the second exchangeable capsule being arranged for moving the at least one portion and especially a central portion from the ready position to the second brewing position.

Further the object is solved by a kit of exchangeable capsules for being used in a system and/or in an apparatus as defined herein, the kit comprising at least a first exchangeable capsule comprising a beverage preparation product and having a first body and an first exit face attached to the first body, and at least a second exchangeable capsule having a second body and a second exit face attached to the second body, the second exit face having a larger diameter than the first exit face.

A solution is also provided by a method for preparing a quantity of beverage suitable for consumption, including introducing either a first exchangeable capsule or a second exchangeable capsule into a the system or an apparatus as defined herein; moving the first brew chamber part from a loading position to a brewing position; and moving at last one portion and especially a central portion of the second brew chamber portion in a first brewing position when a first exchangeable capsule has been introduced to the brew chamber and to a second brewing position when a second exchangeable capsule has been introduced to the brew chamber; supplying a fluid to the capsule for beverage preparation; and discharging a prepared beverage from the capsule.

Herein, a first brewing position may also mean a position which is near to the first brewing position or a position closer to the first brewing position than to a second brewing position unless it is otherwise stated. Herein, locking in a first position may also mean locking in or near a first brewing position or in a position which is closer to the first position than to a second position unless it is otherwise stated. The same applies for the second brewing position, wherein here also a position close to the second brewing position or nearer to the second brewing position than to the first brewing position may be encompassed. The second brewing position and the first brewing position in general may also be understood as to be first and second brewing or extraction positions respectively. A capsule can be any kind of volume body having a body and an exit face able to comprise a beverage preparation product as known from the art. Preferably, a capsule is to be understood having a rigid body and a bottom portion and an exit face arranged opposite to the bottom portion thereby enclosing a space for a beverage preparation product. The capsule may also be provided as a pad, a bag etc. The capsules can be hermetically closed prior to insertion into the apparatus. The closed capsules can e.g. be opened by the apparatus. Alternatively, non-sealed or refillable capsules could also be used.

The beverage preparation product can be e.g. roast coffee, ground coffee, powdered coffee. The beverage preparation product can also be a liquid.

In principle the invention is based on the idea, that at least one portion of the second brew chamber part is arranged such that it is movable from a first brewing position to a second (brewing) position and especially dependent on what kind of capsule, i.e. the first exchangeable capsule or the second exchangeable capsule is positioned in the brew chamber. The first brewing position may be the position where a first exchangeable capsule is brewed; the second brewing position may be the position where a second exchangeable capsule is brewed for beverage preparation. As mentioned above, this position also encompasses positions close to the respective position or closer to the first brewing position than to the second brewing position and vice versa respectively. By such an arrangement at least two different kinds of capsules can be inserted and used with the apparatus for beverage preparation.

The at least one portion, and especially a central portion, as will be explained further below, may be arranged to be selectively moveable from a ready position to the first brewing position and the second brewing position respectively, wherein in the ready position and especially in combination with the first brewing chamber part being in a loading position one of the above capsules can be introduced to the apparatus. The ready position can also be the first brewing position; however, it can also be a position different from the first and/or second brewing positions. By movement of the first brewing chamber part relative to the second brewing chamber part a brewing chamber is defined enclosing the respective capsule introduced. In this situation the entered capsule is hold in the brew chamber, and especially, as will be defined further below, in a cavity of the first brew chamber part, the brew chamber and the cavity, respectively, being closed by the second brew chamber part. Optionally, the cavity of the first brew chamber part is arranged for receiving the first or second capsule. The cavity of the first brew chamber part can be a predetermined cavity arranged for holding the first or second capsule. The cavity can have an invariable shape for holding the first or second capsule. The first brew chamber part can be arranged for holding the first or second capsule without changing a configuration of the first brew chamber part. The first brew chamber part can be a monolithic part. Relief elements, which can be any kind of passive or active opening elements, as will be further explained, can be provided to open the capsule on its exit face side for discharge of a prepared beverage. Piercing elements, which can be any kind of passive or active opening elements, as will be further explained, can be arranged on the inlet side for introduction of a liquid for the beverage preparation. The apparatus may be arranged such that liquid can be introduced to the capsule hold in the cavity for beverage preparation, producing a beverage which can be discharges from the brewing chamber after a certain time.

In principle, the first and the second exchangeable capsule may be of different size and preferably comprise an axial length, wherein the axial length of the second exchangeable capsule may be larger than the axial length of the first exchangeable capsule. With regard to the diameter it may apply that the second exchangeable capsule's diameter is larger than the diameter of the first exchangeable capsule. This diameter is preferably the diameter measured in the area of the exit face. The capsule may comprise a flange or a flange-like rim respectively, wherein the diameter difference of the two capsules may then preferably be measured at the outer diameter of this flange-like rim. It is also possible to define this diameter at the inner diameter of this flange-like rim. Also it may hold that the second exchangeable capsule may have a second body and a second exit face attached to the second body and the first exchangeable capsule may have a first body and a first exit face attached to the first body. Especially in this regard, the second exit face may have a larger diameter than the first exit face.

It may additionally hold that the system includes a locking mechanism arranged for selectively locking the at least one portion of the second brew chamber part in or near the first brewing position. This inter alia guarantees that the capsule hold in the brew chamber stays arranged in the correct position during the beverage preparation process.

In further detail, it may hold that the locking mechanism is arranged for selectively preventing the at least one portion of the second brew chamber part being locked in or near the first brewing position when the second capsule is being loaded into the brew chamber. This allows for movement of the at least one portion of the second brew chamber portion to the required brewing position in dependence of the capsule entered to the apparatus. It may also hold that the locking mechanism is arranged for selectively allowing the at least one portion of the second brew chamber part being moved into the second brewing position when the second capsule is being loaded into the brew chamber.

The above may lead to a timed closing process, where the at least one portion of the second brew chamber part can be moved to its required brewing position in dependency of the capsule entered to the apparatus.

In a special embodiment the first brew chamber part may have a cavity for selectively holding one of the first and second exchangeable capsules. The cavity may have a form, and especially a length and/or a diameter which is not adaptable.

It may also hold that the second brew chamber part comprises a peripheral portion, wherein the at least one portion of the second brew chamber part, movable into the first brewing position and the second brewing position, is a central portion, wherein the central portion is being especially axially movable relative to the peripheral portion to the first brewing position and to the second brewing position. Especially in such configuration the locking mechanism may be arranged for preventing the central portion being locked in the first brewing position when the brew chamber, and especially the cavity holds the second exchangeable capsule. As explained above it may also hold that the locking mechanism is arranged for selectively allowing the central portion being moved into the second brewing position when the second capsule is being loaded into the brew chamber.

It can be provided that the second brew chamber part has an extraction plate for abutting against the first or second exit face of the respective capsules hold in the brew chamber, the extraction plate including the central portion and the peripheral portion. The apparatus my with other word comprise a multi part extraction plate having at least two parts movable relative to each other. By these two parts the brew chamber can be adapted to the respective first or second exchangeable capsule used for beverage preparation.

The locking mechanism may be arranged for locking the at least one portion, and especially the central portion in the first brewing position when the brew chamber and especially the cavity holds the first exchangeable capsule.

The locking mechanism may be provided such that at least one portion, and especially the central portion, being part of the extraction plate, stays situated at its required position, when the first exchangeable capsule is hold in the cavity and especially when a respective pressure is build up in the chamber during the brewing process. To guarantee this, the locking mechanism may be arranged such that it locks the at least one portion, and especially the central portion in the first brewing position when the cavity holds the first exchangeable capsule. Especially with a beverage preparation apparatus making use of capsules having exit faces which open due to being pressurized against relief elements arranged on the extraction plate of the apparatus, this locking mechanism guarantees reliable opening of the exit face as securing the at least one portion, and especially the central portion at its required position, e.g. the first brewing position when a first exchangeable capsule is hold in the brew chamber. This reliable positioning results in a repeatable beverage production process with constant quality.

The apparatus may in general provide the possibility to use first exchangeable capsules and second exchangeable capsules, different in their size and, preferably without any use or input, arrange the extraction plate such that either the first brewing position or the second brewing position is provided during the beverage preparation process so that for each individual capsule the correct extraction and the position of the latter is provided.

The locking mechanism may be arranged such that it not only prevents the at least one portion, and especially the central portion being locked in the first brewing position when a second exchangeable capsule is hold in the cavity but also allows releasing the locking of the central portion in the first brewing position when a second exchangeable capsule is hold in the cavity or when a first exchangeable capsule or a second exchangeable capsule is discharged from the cavity after the preparation process. This might also apply for a locking in the second brewing position.

Also it might be provided that, when the at least one portion, and especially the central portion is positioned in the second brewing position, it may be allowed by a respectively arranged locking mechanism that the at least one portion, and especially the central portion moves to the first brewing position especially when the cavity holds a first exchangeable capsule.

The locking mechanism may be arranged that the at least one portion, and especially the central portion is moveable from a ready position to a second brewing position when the cavity holds the second exchangeable capsule. As explained above the ready position is a position where introducing of a capsule to the apparatus is possible. Preferably, in this ready position, seen from a direction from the ready position to the second brewing position, the at least one portion, and especially the central portion is arranged before the first brewing position. In this case, while the central portion moves from the ready position to the second brewing position, the first brewing position is passed.

The at least one portion, and especially the central portion may be biased to the ready position and preferably biased in the first brewing position and/or biased in the second brewing position and preferably biased by a resilient member. While moving the at least one portion, and especially the central portion especially from the ready position to the first brewing position and/or to the second brewing position, a bias force has therefore to be overcome. A biasing means for providing this bias force and especially a resilient member, e.g. at least one spring is preferably arranged at least one portion, and especially the central portion.

Preferably such biasing means is arranged such that the resulting bias force, especially to be overcome by the capsule to move the at least one portion in its respective first or second brewing position, is lower than a force where the exit face of the capsule tears off (especially in the case when relief elements are provided on the extraction plate). Providing bias of the at least one portion guarantees correct positioning in the first and the second brewing position especially when being locked and further supports opening of the brewing chamber, i.e. moving the first brew chamber part apart from the second brew chamber part after the beverage preparation process.

The locking mechanism can be provided as to release the locking during the opening process of the brew chamber (especially after brewing and for discharge of the used capsule) to support departing of the first brew chamber part from the second brew chamber part. Further and preferably in combination with a biased portion, especially a central portion, the locking mechanism can be arranged such that, after the beverage preparation process, the at least one portion moves to its ready position for starting another beverage preparation process.

The locking mechanism and preferably the first brew chamber part may include an actuator for actuating the locking mechanism and especially the locking process. This actuator may comprise a frontal surface of the first brew chamber part. With this actuator the locking process and especially locking of the at least one portion, and especially of the central portion in the first brewing position and/or also in the second brewing position may be actuated. Also unlocking may be actuated if intended.

The locking mechanism may be arranged such that it is actuated while closing the first brew chamber part against the second brew chamber part. During the closing process the at least one portion, and especially the central portion may be moved especially from the ready position to the first brewing position when the cavity holds a first exchangeable capsule and/or may be moved especially from the ready position to the second brewing position when the cavity holds the second exchangeable capsule. The locking process may be controlled by relative movement of the brew chamber parts and especially without any further input from a user. In principle, the locking mechanism may provide a self-detection mechanism so that dependent on the capsule arranged in the cavity the respective first or second brewing position is provided for the brewing process.

The system and especially the first brew chamber part may be arranged such that when the cavity holds the first exchangeable capsule the capsule and especially a first exit face of the same is recessed into the cavity further than the second exchangeable capsule, and especially a second exit face of the same, when the cavity holds the second exchangeable capsule. This allows activation of the locking mechanism dependent on what capsule has been inserted into the cavity. In general it has to be mentioned that the apparatus can be arranged such that not only a first and a second exchangeable capsule can be inserted into the brew chamber but also a third and further capsule having different sizes etc., wherein all the features mentioned herein can be applied on this situation.

For holding the first and second exchangeable capsules in the brew chamber, and especially the cavity, the first brew chamber part may have a first substantially annular abutment surface in the cavity and a second substantially annular abutment surface, wherein the first abutment surface is arranged for abutting the first exchangeable capsule and preferably a first flange of the capsule there against when the cavity holds the first exchangeable capsule, and wherein the second abutment surface is arranged for abutting a second exchangeable capsule and especially a second flange of the second exchangeable capsule there against when the cavity holds the second exchangeable capsule, wherein the first substantially annular abutment surface is spaced from the second substantially annular abutment surface preferably in an actual direction of the first brew chamber part. In principle, the abutment surfaces in or at the cavity for the first and the second exchangeable capsules are arranged in different positions and especially such that the exit face of the first exchangeable capsule is oriented in a different plane than the exit face of the second exchangeable capsule when the respective capsules are hold in the cavity. The first annular abutment surface and/or the second annular abutment surface can be continuously annular, or may be interrupted annular, such as comprising at least one, optionally a plurality of segments along an annulus. The abutment surface may for example have the shape of one or more, e.g. arched ridges which protrude into the cavity. Also respective ring or segment arrangements can be provided for in general providing a bearing for the capsule hold in the cavity. Beside an annular form also substantially annular forms or any other form can be provided complementary to the especially outer form of the capsule in the abutment area. These forms are also covered by the above definition of the annular abutment surface. The second abutment surface may be positioned near or at the open end of the cavity. The first substantially annular abutment surface and the second substantially annular abutment surface may be immobile relative to each other.

The second exchangeable capsule may be arranged for moving the central portion from the first brewing position to the second brewing position. This movement can especially be actuated by abutting of the exit face of the second exchangeable capsule against the at least one portion, and especially the central portion. While moving the first brew chamber part, the second exchangeable capsule hold in the cavity may push with its exit face against the at least one portion, and especially the central portion, moving it from a ready position and/or any other position to the first brewing position and further to the second brewing position. The same applies for the first exchangeable capsule. This first exchangeable capsule can be arranged for moving the at least one portion, and especially the central portion to the first brewing position. This movement can especially be actuated by abutting of the exit face of the first exchangeable capsule against the at least one portion, and especially the central portion. While moving the first brew chamber part, the first exchangeable capsule, hold in the cavity, may push with its exit face against the at least one portion, and especially the central portion, moving it from a ready position and/or any other position to the first brewing position.

The system may be arranged such that by closing the first brew chamber part against the second brew chamber part, when the cavity holds the second exchangeable capsule, the at least one portion, and especially the central portion is pushed beyond the locking mechanism by the second exchangeable capsule before the locking mechanism is actuated by the first brew chamber part. This in detail guarantees that an automatic transition between especially the ready position and/or the first brewing position to the second brewing position is performed when the second exchangeable capsule is hold in the cavity. The locking mechanism may especially in this regard be provided that it locks the at least one portion, and especially the central portion only in the first brewing position and not in the second brewing position, when the first exchangeable capsule is hold in the brew chamber.

The system may be arranged such that while closing the first brew chamber part against the second brew chamber part, when the cavity holds the first exchangeable capsule, the locking mechanism is actuated by the first brew chamber part before the central portion is pushed beyond the locking mechanism by the first exchangeable capsule. This guarantees reliable functioning of the locking process.

The peripheral portion may be arranged such that it is immobile relative to the second brew chamber part.

The peripheral portion may be arranged to abut against the second exit face when the cavity holds the second exchangeable capsule while brewing. Especially in this regard it is possible to provide the peripheral portion with relief elements for opening the exit face. It is also possible to provide the peripheral portion as a bearing portion only having no relief elements and especially such that only a flange or flange-like rim area of the capsule abuts against, when the cavity holds the second exchangeable capsule while brewing.

The peripheral portion may be arranged to abut against the first brew chamber part when the cavity holds the first exchangeable capsule while brewing. In detail, the first exchangeable capsule may be held in the cavity such that when the first brew chamber part and the second brew chamber part are closed, thereby defining the brewing position, the first exchangeable capsule does not abut against the peripheral portion.

The central portion may be arranged to abut against the second exit face when the cavity holds the second exchangeable capsule while brewing. Relief elements can be arranged at the central portion and/or the peripheral portion for opening the capsule during the brewing process. In a special embodiment the peripheral portion is arranged to abut against the first exit face when the cavity holds the first exchangeable capsule while brewing.

Especially in regard of the above it may be provided that in the second brewing position the central portion is arranged such that it provides a substantially coplanar plane with a plane of the peripheral portion, wherein at this plane preferably the relief elements are arranged for opening the exit face of the second exchangeable capsule. As already mentioned these relief elements can be any kind of passive or active relief elements for opening the capsule and can be further arranged either on the central portion or the peripheral portion only or on both portions. Dependent on the arrangement of the relief elements the exit face is going to be opened for beverage discharging in specific exit areas.

The locking mechanism may include a locker and especially a pivotable finger for locking the at least one portion, and especially the central portion especially in the first brewing position, the locker being activated by the activator preferably during the movement of the first brew chamber part. The locker can be directly or indirectly activated by the activator and can further provide a single-sided locking or a double-sided locking. This means that by the locking mechanism locking of the at least one portion, and especially the central portion against movement from the first brewing position to the second brewing position can be provided, allowing movement in the opposite direction, e.g. from the first and/or second brewing position to the ready position (single-sided locking). It might however also be possible to arrange the locking mechanism such that movement in both directions can be locked, e.g. from the first brewing position to the second brewing position and from the first brewing position to the ready position etc. (double-sided locking). This may also apply with regard to a possible locking in the second brewing position or any other position, as the locking mechanism may be arranged to provide a locking of the central portion also in the second or any other position of necessary.

The locking mechanism may comprise a movable pusher arranged to be moved by the actuator during closing of the first brewing part for translating the locker from an unlocking position into a locking position for locking the at least one portion, and especially the central portion in a desired and especially in the first brewing position. This movable pusher can for example be a pushing rod directly or indirectly contacting the actuator so that it is moved by the actuator to activate the locker. The pusher may also be a pushing ring or a pushing segment. When the locker is a pivotable finger, the movable pusher can, for example, push the pivotable finger from an unlocking position to a locking position.

The locker may be biased to an unlocking position and especially by a resilient member, for example a tensioning spring. Such a biased locker can be activated by the activator and especially by the movable pusher to be translated from the unlocking position in the locking position. It may be arranged such that when the movable pusher gets out of contact with the locker, the biased locker is pushed back to the unlocking position. The locking mechanism can also be arranged such that the movable pusher is connected to the locker such that translation from the unlocking position to the locking position and vice versa is controlled by the movable pusher. The pusher can be arranged in such a way and especially connected with the locker in such a way that when the movable pusher moves in one direction, the locker is translated from an unlocking position to the locking position and when the movable pusher moves in the opposite direction, the locker is moved from the locking position to an unlocking position.

The pusher may be biased to an extended position towards the actuator of the first brew chamber part. Especially in such a configuration the first brew chamber part is arranged in such a way that when the first brew chamber part moves in direction of the second brew chamber part, the actuator contacts the pusher moving the pusher during its own movement, thereby translating the locker from the unlocking position to the locking position. Bias of the pusher may be provided by a resilient element. Especially in this regard it might be provided that the resilient element for biasing the pusher is providing a lower bias force than a resilient element biasing the central portion.

The locking mechanism can be arranged such that it in a locking manner interacts with the at least one portion, and especially the central portion and especially with a shaft of the central portion extending along the axis of movement of the central portion. Especially the locker is arranged to interact in a locking and releasing manner with the at least one portion, and especially the central portion and especially a respective shaft of the same. The locker may comprise a projecting element and especially a thumb projecting in the locking position into the movement path of the central portion, thereby locking movement of the at least one portion, and especially the central portion in the first brewing position. This may also be arranged so that the at least one portion, and especially the central portion can be locked in the second brewing position. The projection element may be provided that it provides a bearing the at least one portion, and especially the central portion can abut against so that a locking of the at least one portion, and especially the central portion, especially against a further movement from the first brewing position to a second brewing position. The at least one portion, and especially the central portion preferably comprises a counter locker, the locker and especially its projection element can engage with. This counter locker can e.g. be a projection part or similar projection element the locker can be lockingly attached to, at least for a single-sided locking. Especially for double-sided locking the at least one portion, and especially the central portion and the locker may comprise respective engagement elements for double-side locking, e.g. a tongue-and-groove joint arrangement etc.

The pusher may be slidably guided in a body of the second brew chamber part, wherein especially the body provides a respective guiding means for supporting the pusher to be slideable especially along one sliding axis in two opposite directions.

The locker may be pivotably arranged at a body of the second brew chamber part and optionally at the same body the pusher is guided in, and especially may be provided as a pivotable finger. By providing a pivotably arranged locker, translation from the unlocking position to the locking position and vice versa can be easily implemented.

The actuator may be arranged in such a way that, seen in a direction from the actuator towards the second brew chamber part, when the cavity holds the first exchangeable capsule, the outermost part of the first exchangeable capsule is positioned rearwardly relative to the actuator and, when the cavity holds the second exchangeable capsule, the outermost part of the second exchangeable capsule is positioned frontwards relative to the actuator, so that, dependent on whether a first or a second capsule is hold in the cavity, the locking mechanism is actuated by the actuator at the first brew chamber part before the central portion is pushed beyond the locking mechanism by the first exchangeable capsule or the locking mechanism is actuated by the actuator of the first brew chamber part after the at least one portion, and especially the central portion is pushed beyond the locking mechanism by the second exchangeable capsule, respectively.

Although the locking mechanism is described as having a locker and a pusher, it may be provided that multiple pushers and/or lockers are provided. The pushers and lockers can be provided having a rod-like form. However, it is also possible to provide these elements so as to comprise an annular form or a segment form etc.

The locker is preferably provided with a slope face the actuator can slide along to continuously translate the locker from the unlocking position to a locking position. By the form of this slope face and the position relative to the pusher and the actuator, respectively, timing of the closing can be controlled. The pusher preferably comprises a lip or any kind of similar projection extending from the pusher, preferably orthogonal thereto and cooperating with the locker, and preferably with the slope face so as to slide along there translating the locker from the unlocking position to the locking position. The locker, as mentioned, may be provided as to be biased in the unlocking position by a resilient element or any similar element resulting in retraction of the locker from the locking position to the unlocking position as soon as the connection between the pusher and the locker, e.g. between the lip and the slope face is released. Such a slope face can be provided for activating the locking, but it can also be provided for deactivating the locking.

As mentioned before, the invention also relates to methods for preparing a quantity of beverage suitable for consumption. For redundancy reasons, the different embodiments of these methods are not explained in detail, but it is referred to all the features explained herein especially dealing with the system, the apparatus and the capsule, respectively. It is obvious that these features can also be provided with the method for beverage production, and vice versa.

This also applies for the described apparatus, the use of a second exchangeable capsule, the second exchangeable capsule and a kit of exchangeable capsules mentioned before. For redundancy reasons, the different embodiments of those are not explained in detail, but it is referred to all the features explained herein especially dealing with the system. It is obvious that these features can also be provided with the apparatus, the use of a second exchangeable capsule, the second exchangeable capsule and a kit of exchangeable capsules, respectively and vice versa.

Again, it will be appreciated that any of the embodiments, aspects, features and options described in view of the system apply equally to the apparatus, capsules and method. It will also be clear that any one or more of the above embodiments, aspects, features and options can be combined.

BRIEF DESCRIPTION OF THE DRAWINGS

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing:

FIG. 2a shows a schematic isometric representation of the apparatus according to FIG. 1a;

FIG. 2b shows a schematic semi-transparent side view of the system according to FIG. 2a;

FIG. 7a shows a schematic representation of a side view of the embodiment of FIG. 1 during ejection of a first exchangeable capsule;

DETAILED DESCRIPTION

Figure 1A:
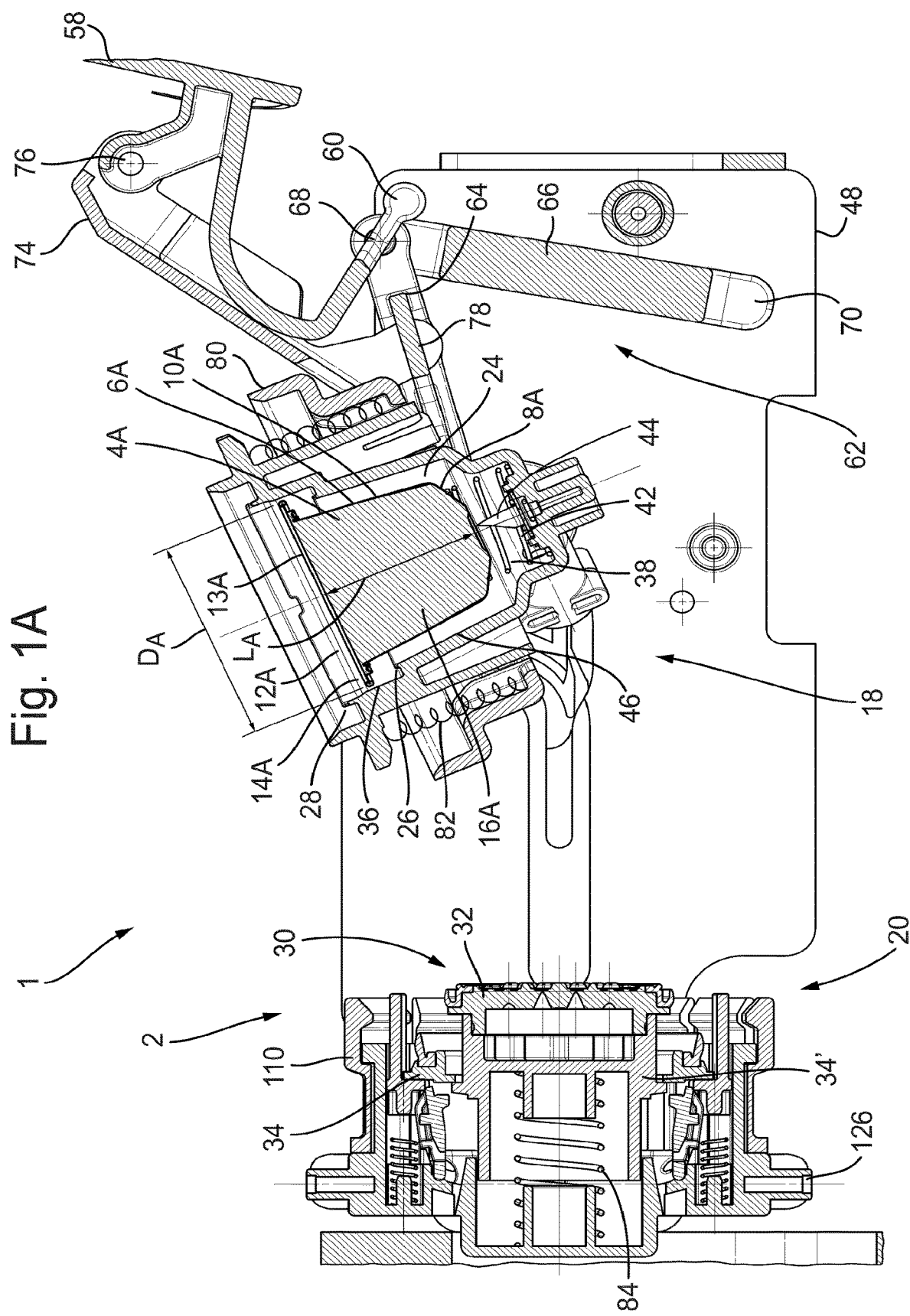
FIG. 1a shows a schematic representation of one embodiment of the apparatus and system according to the invention, respectively, holding a first exchangeable capsule in an open position.
Figure 1B:
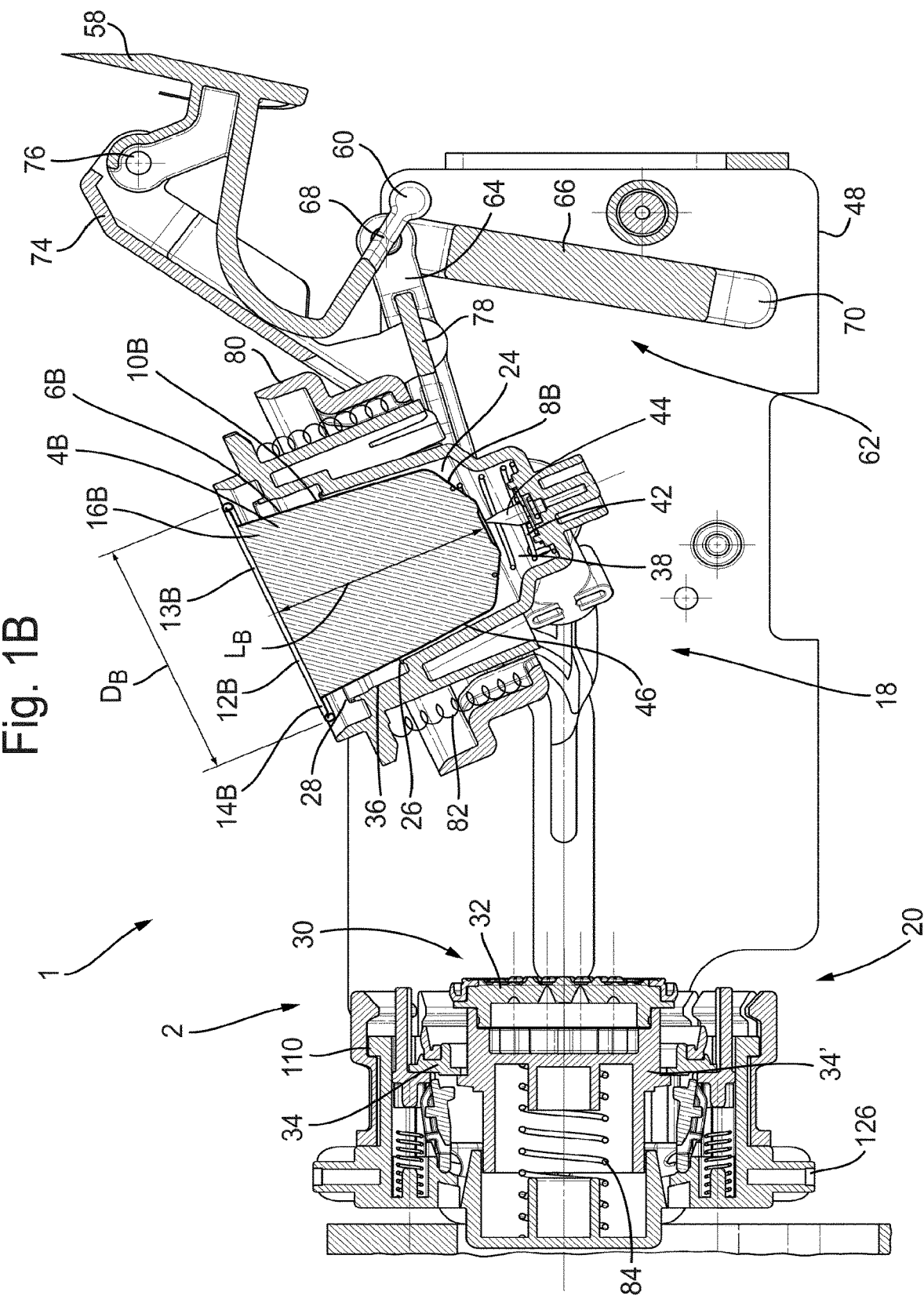
FIG. 1b shows the schematic representation of the embodiment of FIG. 1a, holding a second exchangeable capsule.

FIGS. 1A and 1B show schematic cross sectional views of a system 1 for preparing a beverage. The system includes an apparatus 2 and ad least one exchangeable capsule, namely a second exchangeable capsule 4B and further optionally a first exchangeable capsule 4A. Here the system 1 is arranged for cooperating with the second exchangeable capsule 4B and optionally with the first exchangeable capsule 4A. The apparatus 2 shown in FIGS. 1A and 1B is one and the same apparatus. The apparatus 2 is arranged for selectively cooperating with either the first exchangeable capsule 4A (see FIG. 1A) or the second exchangeable capsule 4B (see FIG. 1B). It will be appreciated that the system 1 can include the apparatus 2, the second exchangeable capsule 4B and also the first exchangeable capsule 4A.

The first and second exchangeable capsules 4A, 4B are of a different type. In this example, the second exchangeable capsule 4B is larger than the first exchangeable capsule 4A. An axial length $L_B$ of the second exchangeable capsule 4B may be larger than an axial length $L_A$ of the first exchangeable capsule 4A. A diameter $D_B$ of the second exchangeable capsule 4B may be a larger than a diameter $D_A$ of the first exchangeable capsule 4A. Notwithstanding the differences, in this example the first and second exchangeable capsules 4A, 4B are designed to make a similar visual impression. The first and second exchangeable capsules 4A, 4B are designed to have a family look and feel. Here a ratio of the axial length and diameter $L_A/D_A$ of the first exchangeable capsule 4A is substantially the same as a ratio of the axial length and diameter $L_B/D_B$ of the second exchangeable capsule 4B. Preferably, the length to diameter ratio of the first and second exchangeable capsules is identical within 20%, preferably within 10%, e.g. identical.

The two capsules 4A and 4B may provide a set of capsules to be used in the apparatus 1.

In view of the similarity, both capsules 4A, 4B will now be described simultaneously. In this example, the capsules 4A, 4B both include a cup-shaped body 6A, 6B. Here the cup-shaped body 6A, 6B includes a bottom 8A 8B and a circumferential wall 10A, 10B. The bottom 8A, 8B and the circumferential wall 10A, 10B can form a monolithic part. The capsules 4A, 4B both include an exit face 12A, 12B, especially comprising a lid, attached to the body. The exit face 12A, 12B closes off an open end of the cup-shaped body 6A, 6B. Here the lid closes of the open end. The exit face 12A, 12B includes an exit area 13A, 13B through which beverage can be drained from the capsule as explained below. In this example the exit face 12A, 12B comprises a flange-like rim 14A, 14B of the capsule 4A, 4B. Here the rim 14A, 14B is an outwardly extending rim. The bottom 8A, 8B, the circumferential wall 10A, 10B and the rim 14A, 14B can form a monolithic part. Here the exit area 13A, 13B defines the area of the exit face 12A, 12B, and here also of the lid respectively, through which the beverage can potentially exit the capsule 4A, 4B. Hence, an area of the exit face 12A, 12B, sealed to the rim 14A, 14B does not constitute part of the exit area 13A, 13B. In this example, the capsules 4A, 4B are substantially rotation symmetric around an axis extending from the bottom 8A, 8B to the exit face 12A, 12B. The cup-shaped body 6A, 6B and the exit face 12A, 12B enclose an inner space 16A, 16B of the capsule. The inner space 16A, 16B includes a quantity of beverage preparation product, such as an extractable or soluble substance. The beverage preparation product can e.g. be roast and ground coffee, tea, or the like. The beverage preparation product can be powdered coffee. The beverage preparation product can be a liquid. In view of the difference in size of the capsules 4A, 4B it will be appreciated that the second exchangeable capsule 4B can include a larger quantity of beverage preparation product than the first exchangeable capsule 4A. In this example, the inner space 16B of the second exchangeable capsule 4B is about twice the inner space 16A of the first exchangeable capsule 4A. For example, the first exchangeable capsule 4A may include 4-8 grams, e.g. about 6 grams, of ground coffee. For example, the second exchangeable capsule 4B may include 8-16 grams, e.g. about 12 grams, of ground coffee.

The cup-shaped body 6A, 6B can be manufactured from a metal foil, such as aluminium foil, a plastics material, such as polypropylene or polyethylene, or a combination thereof. The cup-shaped body 6A, 6B can be manufactured by pressing, deep-drawing, vacuum forming, injection moulding or the like. The exit face and especially the lid can be manufactured from a metal foil, such as aluminium foil, a plastics material, such as polypropylene or polyethylene, or a combination thereof. In the example the capsules 4A, 4B are so-called closed capsules. This indicates capsules that are hermetically closed prior to insertion into the apparatus. The closed capsules can be opened by the apparatus as described below. Alternatively, non-sealed or refillable capsules could also be used.

The apparatus includes a first brew chamber part 18 and a second brew chamber part 20. The first and second brew chamber parts 18, 20 can be closed against each other to form a brew chamber 22A, 22B (not shown in FIGS. 1A, 1B; see e.g. FIGS. 5 and 6).

The first brew chamber part 18 may include a cavity 24. The cavity 24 is arranged for receiving the first or second exchangeable capsule 4A, 4B. Here the cavity 24 of the first brew chamber part 18 is a predetermined cavity 24 arranged for holding the first or second capsule 4A, 4B. Here the cavity 24 has an invariable shape for holding the first or second capsule 4A, 4B. Here the first brew chamber part 18 is arranged for holding the first or second capsule 4A, 4B without changing a configuration of the first brew chamber part 18. In this example the first brew chamber part 18 is a monolithic part. In this example the first brew chamber part 18 includes a first abutment surface 26. The first abutment surface may be positioned inside the cavity 24. Here the first abutment surface 26 is a first generally annular abutment surface. The first generally annular abutment surface 26 can be continuously annular, or it may be interrupted annular, such as comprising at least one, optionally a plurality of segments along an annulus. The first abutment surface 26 may for example take the shape of one or more, e.g. arched, ridges which protrude into cavity 24. Here the first abutment surface 26 provides the cavity 24 with a stepped shape. In this example the first brew chamber part 18 includes a second abutment surface 28. The second abutment surface may be positioned near the open end of the cavity 24. Here the second abutment surface 28 is a second generally annular abutment surface. The second generally annular abutment surface 28 can be continuously annular, or it may be interrupted annular, such as comprising a plurality of segments along an annulus. The second abutment surface 28 may for example take the shape of one or more, e.g. arched, ridges. It will be appreciated that the first abutment surface 26 and the second abutment surface 28 may be spaced at a mutual distance especially in an axial direction of the first brew chamber part 18. The first abutment surface 26 and the second abutment surface may be positioned at a fixed spacing: the may be immobile relative. The first abutment surface 26 and the second abutment surface may be immobile relative to each other. Here, the first brew chamber part 18 includes an ejector 38. In this example the ejector 38 includes a conical ring and/or a resilient element 42, here a helical spring. The first brew chamber part 18 may include piercing means 44 for piercing the bottom of the capsule. Here the piercing means includes a plurality of knives, such as three knives.

The second brew chamber part 20 may include an extraction plate 30. In this example, the extraction plate 30 includes a central portion 32 and a peripheral portion 34. The central portion 32 is movable relative to the peripheral portion 34. Here the central portion 32 is movable in an axial direction of the second brew chamber part 20.

The system 1 as described thus far can be used for preparing a beverage as follows. Further features of the system 1 will be explained along the way.

In the example of FIGS. 1A and 1B the apparatus 2 is in a state ready for receiving a capsule, i.e. an open or loading position. In FIGS. 1A and 1B the capsule 4A, 4B has just been inserted into the cavity 24 of the first brew chamber part 18. The first brew chamber part 18 here is in an inclined position. It may be provided in any position where introduction of the capsules is possible. The open end of the cavity 24 may point substantially upwards.

As shown in FIG. 1A, the first exchangeable capsule 4A can fall into the cavity 24 especially under the influence of gravity. Herein the rim 14A of the first exchangeable capsule 4A is guided by an inner surface 36 of the first brew chamber part 18. The bottom 8A of the first exchangeable capsule 4A lowers into the cavity 24, and here until it abuts against the ejector 38. Here the bottom 8A of the first exchangeable capsule 4A centers on the ejector 38. It will be appreciated that the rim 14A of the first exchangeable capsule 4A is positioned between the first abutment surface 26 and the second abutment surface 28. The bottom 8A of the first exchangeable capsule 4A is not yet pierced in this state.

As shown in FIG. 1B, the second exchangeable capsule 4B can also fall into the cavity 24 especially under the influence of gravity. Herein the circumferential wall 10B of the second exchangeable capsule 4B is guided by an inner surface 46 of the first brew chamber part 18. The bottom 8B of the second exchangeable capsule 4B lowers into the cavity 24, and here until it abuts against the ejector 38. Here the bottom 8B of the second exchangeable capsule 4B centers on the ejector 38. It will be appreciated that the rim 14B of the second exchangeable capsule 4B is positioned beyond the second abutment surface 28 when seen from the piercing means 44. The bottom 8B of the second exchangeable capsule 4B is not yet pierced in this state.

It has to be mentioned that also capsules having now rim or similar projection might be used with the apparatus and system according to the invention.

Once the capsule 4A, 4B is inserted into the cavity 24 as shown in FIGS. 1A and 1B, the first brew chamber part 18 can be moved towards the second brew chamber part 20 for closing the brew chamber around the capsule 4A, 4B. The first brew chamber part 18 is guided in a frame 48 of the apparatus.

Figure 2A:
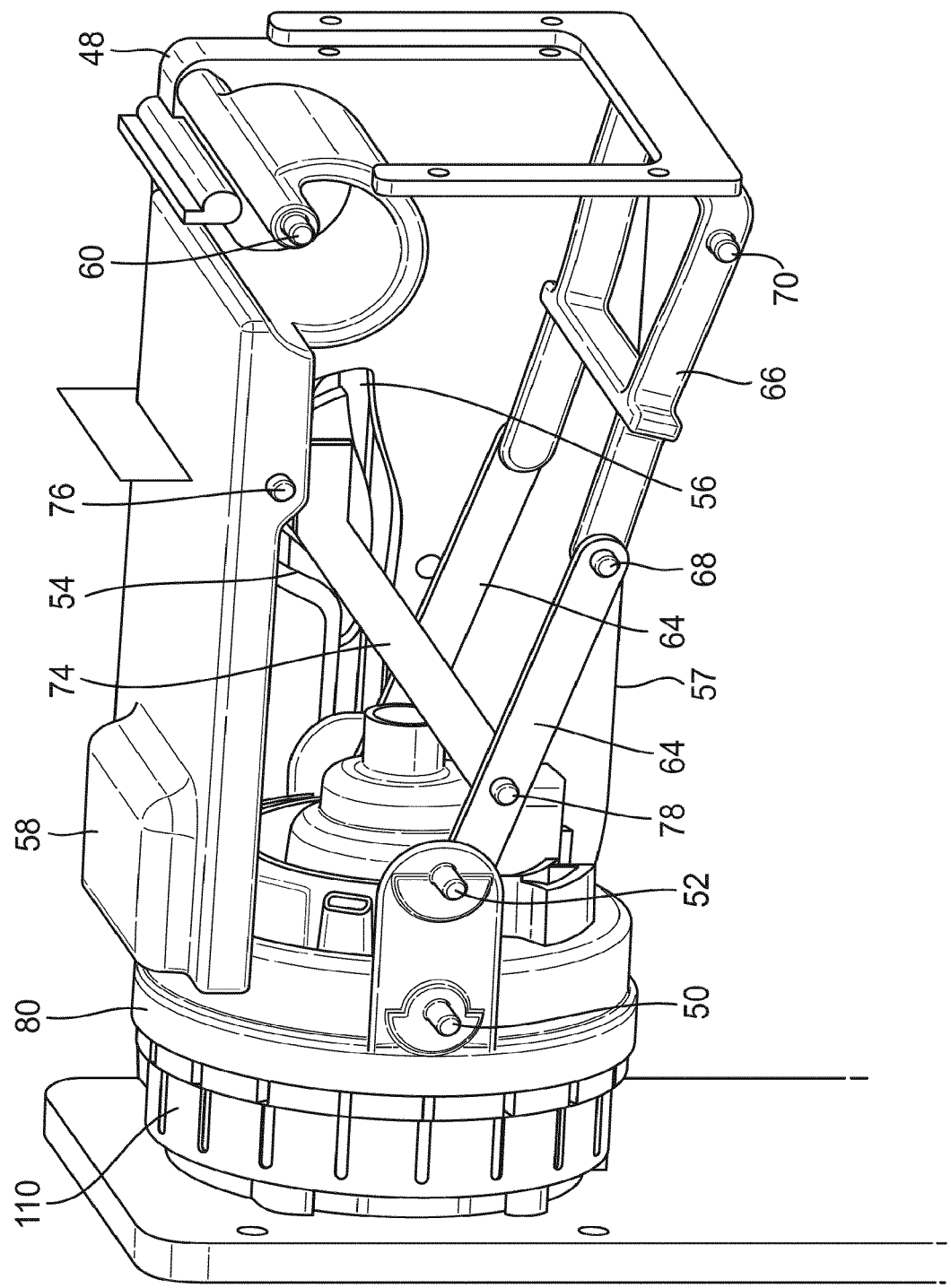

In this example the first brew chamber part 18 includes first bosses 50 and second bosses 52 as shown in FIGS. 2A and 2B. The first bosses 50 are guided in a first groove 54 of the frame 48. The second bosses 52 are guided in a second groove 56 of the frame 48. It will be appreciated that the bosses 50, 52 and grooves 54, 56 determine the path that will be followed by the first brew chamber part 18 during its movement. Here the first groove 54 and the second groove 56 are provided in a side wall 57 of the frame 48. The first groove 54 may extend into the side wall 57 to a first depth. The second groove 56 may extend into the side wall 57 to a second depth. The second depth may be larger than the first depth. The first boss 50 may have a larger diameter than the second boss 52, or vice versa. The first groove 54 may have a larger width than the second groove 56, or vice versa. The width of the first groove 54 corresponds to the diameter of the first boss 50. The width of the second groove 56 corresponds to the width of the second boss 52. It will be appreciated that the first groove 54 extends along a different trajectory than the second groove 56. The different widths and/or depths of the grooves allow the first and second bosses 50, 52 to follow different trajectories. This construction allows a very compact construction for guiding the first and second bosses 50, 52.

The apparatus 2 may include a lever 58. The lever can especially be actuated manually by a user. The lever is pivotally connected to the frame 48 around a lever axis 60. The first brew chamber part 18 is connected to the frame 48 via a knee joint 62. The knee joint 62 may include a push rod 64 and a crank 66. The push rod 64 may be pivotally connected to the crank 66 at a knee axis 68. The crank 66 may be pivotally connected to the frame 48 at a crank axis 70. The lever 58 may be connected to the knee joint 62 for actuating the first brew chamber part 18 in motion. Here the lever 58 may be connected to the knee joint 62 through a lever link 74. The lever link 74 may be pivotally connected to the lever 58 at a lever link axis 76. The lever link 74 may be pivotally connected to the push rod 74 at a knee link axis 78.

As shown with FIG. 5 an arresting ring 80 may be arranged surrounding the first brew chamber part 18. The arresting ring 80 may be axially movable relative to the first brew chamber part 18. Here, the arresting ring 80 is guided by an external surface of the first brew chamber part 18. The arresting ring may be connected to the first brew chamber part via one or more resilient elements 82, here helical springs. Here the push rod is pivotally connected to the arresting ring 80 at a push rod axis 72. Hence, here the knee joint 62 is indirectly connected to the first brew chamber part 18, viz. via the arresting ring 80 and one or more resilient elements 82. The function of the arresting ring will be set out below.

When the lever 58 is moved in a downward direction, here the knee joint 62 will push the first brew chamber part 18 towards the second brew chamber part 20. Simultaneously, due to the shape of the first and second grooves 54, 56, the first brew chamber part 18 will be rotated from the upwards inclined orientation into a an aligned orientation in which an axial direction of the first brew chamber part 18 is aligned with an axial direction of the second brew chamber part 20.

As mentioned above, the apparatus 2 is arranged for selectively cooperating with either the first exchangeable capsule 4A or the second exchangeable capsule 4B. Here, the system 1 is arranged for automatically adjusting the brew chamber depending on whether the first or the second exchangeable capsule has been inserted. This provides the advantage that no user input is required for selecting proper handling of the first or second exchangeable capsule. Hence, the risk of errors is greatly reduced.

As shown in FIG. 3 the apparatus comprises a first brew chamber part 18 and a second brew chamber part 20 forming a brew chamber 21 for selectively holding one of the first and second exchangeable capsules 4A, 4B. The apparatus my further comprise a fluid supply system 19 (shown in FIGS. 8A and 8B) for supplying an amount of fluid, such as water, under pressure to the first brew chamber part 18.

According to the invention at least a portion 32 of the second brew chamber part 20, here e.g. a central portion 32, is movable into a first brewing position and a second brewing position.

In detail, the first brew chamber part 18 is movable between a loading position and a brewing position, wherein the first brew chamber part 18 in the loading position together with the second brew chamber part 20 defines an open position in which the capsule 4A, 4B can be inserted into the brew chamber 21. Further the first brew chamber part 18 in the brewing position together with the at least one portion 32, e.g. the central portion 32 of the second brew chamber part 20 in the first brewing position defines a closed position in which the first exchangeable capsule 4A fits in the brew chamber 21, and the first brew chamber part 18 in the brewing position together with the at least one portion 32 of the second brew chamber part 20 in the second brewing position defines a closed position in which the second exchangeable capsule 4B fits in the brew chamber 21.

The second brew chamber part 20 may include an extraction plate 30 with a central portion 32 and a peripheral portion 34. Here the central portion 32 is movable especially in an axial direction of the second brew chamber part 20. It has to be mentioned that specifications given for this central portion herein, may also apply in general for the at least one movable portion of the second brew chamber part, wherein the central portion is simply a special embodiment of this at least one portion 32.

The central portion 32 in this example includes a shaft 32' axially slidably movable with respect to the frame 48. The central portion 32 may be connected to the second brew chamber portion and especially to the frame 48 via a resilient member 84, here a helical spring. The resilient member 84 biases the central portion into a ready position in FIGS. 1A and 1B. The ready position is an extended position in this example. The central portion 32 can be positioned in a first brewing position for cooperating with the first exchangeable capsule 4A. The central portion can be positioned in a second brewing position for cooperating with the second exchangeable capsule 4B. The central portion 32 may be biased to the ready position and preferably biased in the first brewing position and/or biased in the second brewing position. As mentioned for biasing, i.e. especially pre-tensioning a resilient member or similar tensioning element can be provided.

In this example, the system 1 includes a locking mechanism 86 arranged for selectively locking the at least one portion, and especially the central portion 32 in or near the first brewing position when the cavity 24 holds the first exchangeable capsule 4A. it holds that the locking mechanism is arranged for selectively preventing the at least one portion 32 of the second brew chamber part 20 being locked in or near the first brewing position when the second capsule 4B is being loaded into the brew chamber 21. Also the locking mechanism 86 may be arranged for selectively allowing the at least one portion 32 of the second brew chamber part 20 being moved into the second brewing position when the second capsule 4B is being loaded into the brew chamber 21. Also it holds that the locking mechanism 86 is arranged for selectively preventing the at least one portion 32 of the second brew chamber part 20 being moved into the second brewing position when the first capsule 4A is being loaded into the brew chamber 21.

Also locking and/or preventing, respectively, of the central portion in a position nearer the first brewing position than the second brewing position may be covered by this definition. With regard to the definition of this first brewing position also to the above general part is referred.

In general and as already explained, the system and especially the second exchangeable capsule 4B may be arranged for moving the central portion 32 from the first brewing position to the second brewing position. It is also possible that the system is arranged such that, while closing the first brew chamber part 18 against the second brew chamber part 20, when the cavity 24 holds the second exchangeable capsule 4B, the central portion 32 is pushed beyond the locking mechanism 86 by the second exchangeable capsule 4B before the locking mechanism 86 is actuated by the first brew chamber part 18. Further it holds that system may be arranged such that, while closing the first brew chamber part 18 against the second brew chamber part 20, when the cavity 24 holds the first exchangeable capsule 4A, the locking mechanism 86 is actuated by the first brew chamber part 18 before the central portion 32 is pushed beyond the locking mechanism by the first exchangeable capsule 4A.

With regard the brewing position of the capsule 4A, 4B it may hold that the peripheral portion 34 is arranged to abut against the second exit face 12B when the cavity 24 holds the second exchangeable capsule 4B while brewing. Also the peripheral portion 34 may be arranged to abut against the first brew chamber part 18 when the cavity holds the first exchangeable capsule 4A while brewing. Further it may be possible that the central portion 32 is arranged to abut against the second exit face 12B when the cavity 24 holds the second exchangeable capsule 4B while brewing and/or also may be arranged to abut against the first exit face 12A of the first exchangeable capsule 4A when the cavity holds the first exchangeable capsule 4A while brewing.

The locking mechanism 86 may include a locker 88. Here the locker 88 is designed as a pivotable finger, pivotable around a pivoting axis 90. The locker 88 may be biased into a position pivoted away from the shaft 32', especially in an unlocking position. The locker could also be biased into any other suitable position. The locking mechanism 86 further may include a pusher 92. The pusher may be slidably guided in a body 94 of the second brew part 20. The pusher 92 may be connected to the body 94 via a resilient member 96, here a helical spring. The resilient member 96 biases the pusher in an extended position and especially towards an actuator of the first brew chamber part. The first brew chamber part 18 may include such an actuator 98. Here the actuator is formed by a frontal surface of the first brew chamber part 18. The actuator 98 may be arranged in such a way that, seen in a direction towards the second brew chamber part 22, that, when the cavity 24 holds the first exchangeable capsule 4A, the outermost part of the first exchangeable capsule 4A is positioned rearwardly relative to the actuator 98 and, when the cavity 24 holds the second exchangeable capsule 4B, the outermost part of the second exchangeable capsule is positioned rearwardly relative to the actuator 98, so that the locking mechanism 86 is actuated by the first brew chamber part 18 before the central portion 32 is pushed beyond the locking mechanism 86 by the first exchangeable capsule or the locking mechanism 86 is actuated by the first brew chamber part 18 after the central portion is pushed beyond the locking mechanism by the second exchangeable capsule respectively.

The locking mechanism 86, optionally including the locker, and especially the pivotable finger, is arranged for locking the central portion in the first brewing position, wherein the locker may be activated by the activator preferably during the movement of the first brew chamber part.

In principle the locking mechanism may be arranged for locking the central portion in the first brewing position, when the cavity holds the first exchangeable capsule. Further the locking mechanisms may be arranged for preventing the central portion being locked in the first brewing position when the cavity holds the second exchangeable capsule.

Figure 3A:
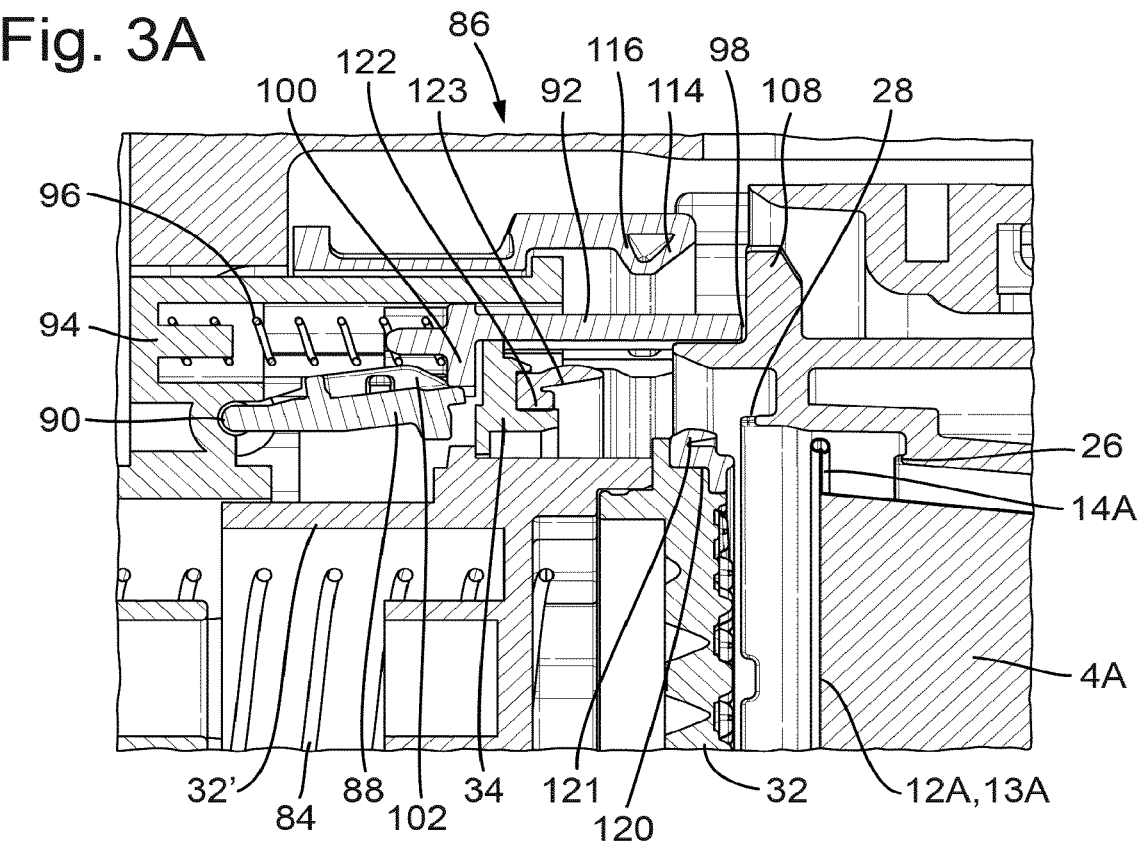
FIGS. 3a and 3b show a detailed schematic representation of the system according to FIG. 1 holding a first exchangeable capsule.
Figure 3B:
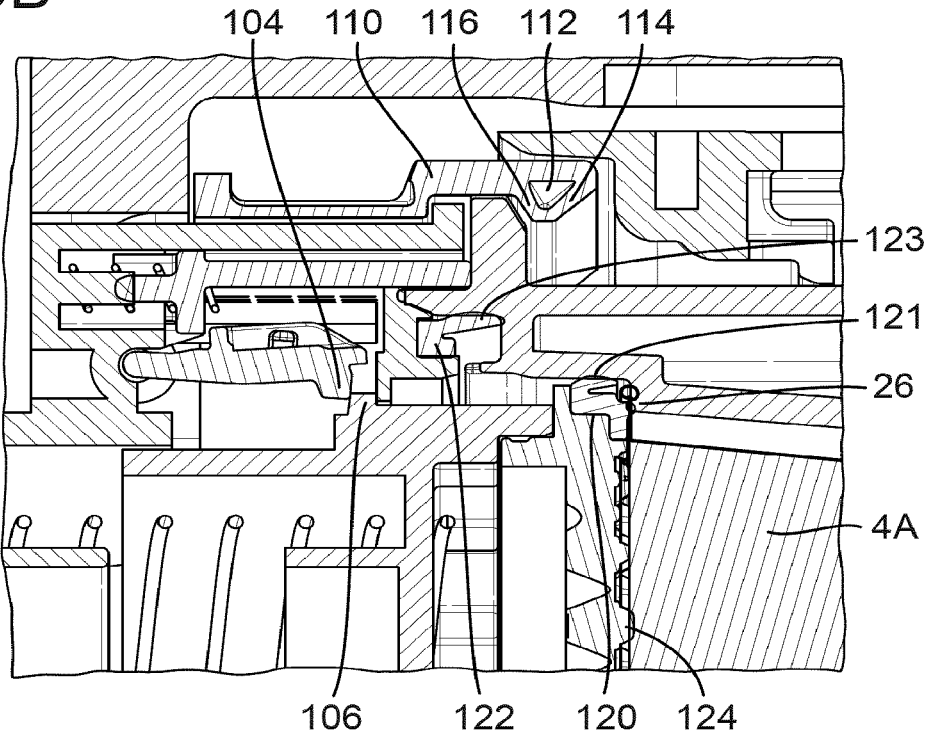

FIGS. 3A and 3B show functioning of the locking mechanism 86 when the cavity 24 holds the first exchangeable capsule 4A. In this example, an outermost part of the first exchangeable capsule 4A, here formed by the exit face 12A, exit area 13A and/or rim 14A, is positioned rearwardly, i.e. more towards the piercing means 44, relative to the actuator 98. As a result, when advancing the first exchangeable capsule 4A towards the second brew chamber part 20, the actuator 98 will touch the pusher 92 before the outermost part of the first exchangeable capsule 4A will touch the central portion 32. The pusher may be pushed against a biasing force of a resilient member 96. A lip 100 of the pusher 92 may slide along a sloping surface 102 of the locker 88, causing the locker 88 to translate and especially pivot towards the locking position and here towards shaft 32'. As a result, locking is engaged, and especially here a thumb 104 of the locker 88 may be placed in a path of movement of part 106 of the central portion 32 (see FIG. 3B). When the first exchangeable capsule 4A is advanced further towards the second brew chamber part 20 the first exchangeable capsule 4A will abut against the central portion 32. This can cause the central portion to be pushed against the biasing force of the resilient member 84. The especially pivoted locker 88 prevents travel of the central portion beyond a position where the part 106 abuts against the thumb 104. This is herein defined as the first (brewing) position. Hence, the first exchangeable capsule 4A is arranged for moving the central portion 32 from the ready position to the first brewing position. The first exchangeable capsule 4A is held between the first and second brew chamber parts 18, 20 while brewing, wherein the central portion 32 is in the first brewing position. This is defined as to be the brewing position.

Figure 4A:
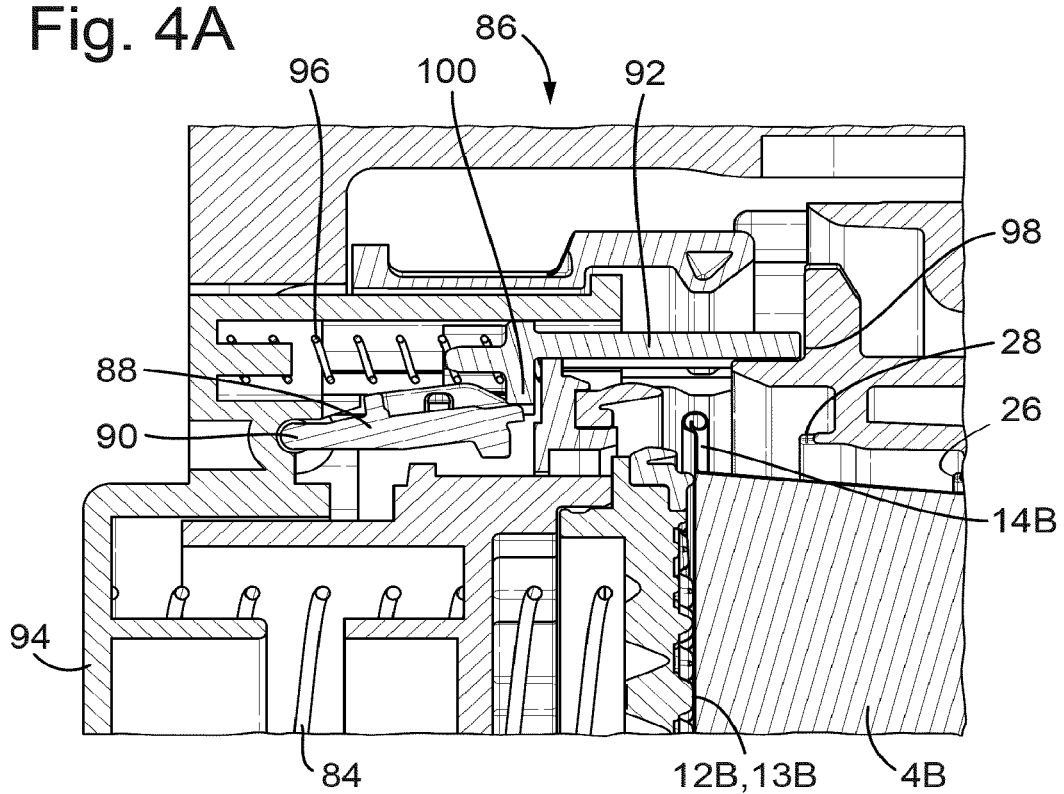
FIGS. 4a and 4b show a detailed schematic representation of the system according to FIG. 1 holding a second exchangeable capsule.
Figure 4B:
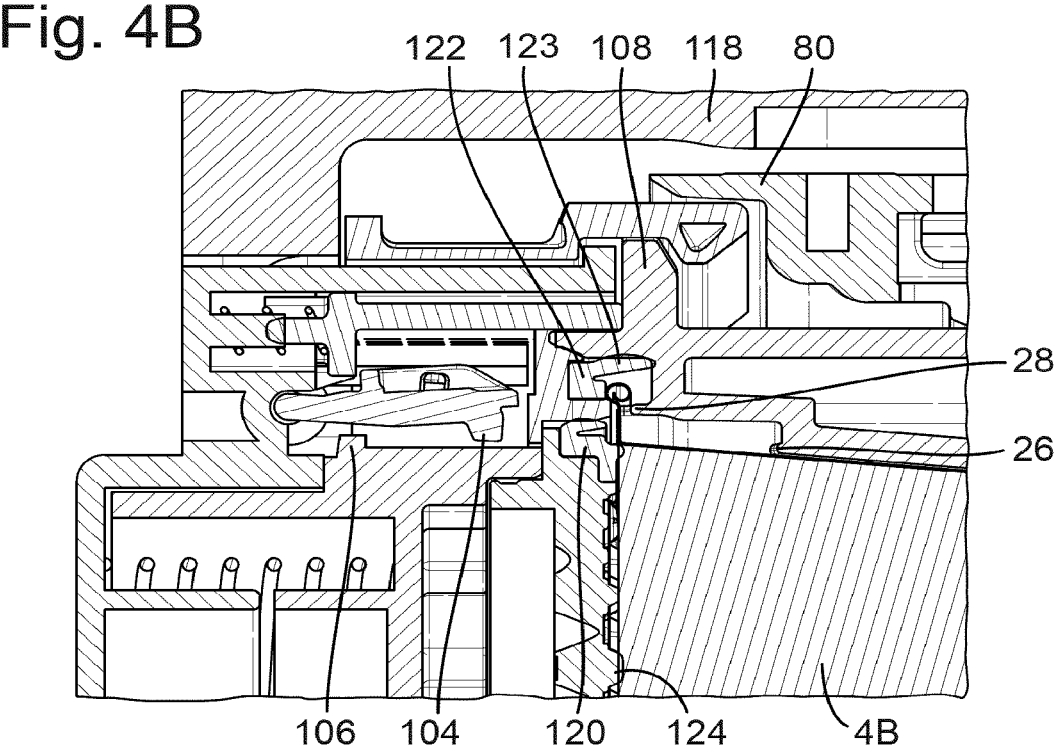

FIGS. 4A and 4B show functioning of the locking mechanism 86 when the cavity 24 holds the second exchangeable capsule 4B. In this example, an outermost part of the second exchangeable capsule 4B, here formed by the exit face 12B, exit area 13B and/or rim 14B, is positioned forwardly, i.e. more towards the second brew chamber part 20, relative to the actuator 98. It has to be mentioned that the apparatus and especially the cavity can be arranged such that, when the cavity holds the first exchangeable capsule the first exit face is recessed into the cavity further than the second exit face when the cavity holds the second exchangeable capsule.

As a result, when advancing the second exchangeable capsule 4B towards the second brew chamber part 20, the outermost part of the second exchangeable capsule 4B may abut against the central portion 32 before the actuator 98 will touch the pusher 92. The central portion 32 may be pushed against the biasing force of the resilient member 84 while the locker 88 is still in the unlocking position and especially pivoted away from the shaft 32'. As a result, the part 106 passed underneath the thumb 104. Only after the part 106 has passed the thumb 104 the pusher is pushed against the biasing force of the resilient member 96 by the actuator 98. The lip 100 of the pusher 92 will still slide along the sloping surface 102 of the locker 88, causing the locker 88 to pivot towards the shaft 32'. However, the part 106 has already passed the thumb 104 at that moment. In this example, the second exchangeable capsule 4B pushes the central portion 32 in abutment with the body 94. This is herein defined as the second brewing position. Hence, the second exchangeable capsule 4B is arranged for moving the central portion 32 from the ready position to the second brewing position. The second exchangeable capsule 4B is held between the first and second brew chamber parts 18, 20 while brewing, wherein the central portion 32 is in the second brewing position.

Thus, the locking mechanism 86 is arranged for preventing the at least one portion, and especially the central portion 32 being locked in or near the first brewing position when the second exchangeable capsule 4B is included in the brew chamber.

It is noted that the locking may be single-sided, viz. the locking mechanism may prevent the central portion 32 from being moved beyond the first extraction position when the cavity 24 holds the first exchangeable capsule 4A. However movement of the central portion 32 from the first extraction position to the ready position may be not prevented.

The locking mechanism 86 may be arranged for locking the at least one portion, and especially the central portion 32 in the first extraction position when the cavity 24 holds the first exchangeable capsule 4A. The locking mechanism 86 may be arranged for allowing the central portion 32 being moved into the second brewing position when the second exchangeable capsule is included in the brew chamber.

When comparing FIGS. 3A and 4A it will be appreciated that while advancing the first brew chamber part 18 towards the second brew chamber part 20 here the first exchangeable capsule 4A is recessed further into the first brew chamber part than the second exchangeable capsule 4B. Then the first exit face 12A, exit area 13A and/or rim 14B is recessed further into the first brew chamber part 18 than the second exit face 12B, exit area 13B and/or rim 14B.

When comparing FIGS. 3B and 4B it will be appreciated that when the brew chamber holds the first exchangeable capsule 4A, here the central portion 32 extends into the cavity 24. Especially the central portion 32 extends into the first brew chamber part 18 beyond a position where the exit face 12B, exit area 13B and/or rim 14B of the second exchangeable capsule 4B would have been, had the second exchangeable capsule been included in the first brew chamber part 18.

In the light of the above it can be said that the locking mechanism 86 may be arranged for preventing the central portion 32 being locked in the first brewing position when the cavity 24 holds the second exchangeable capsule. Further it may be arranged for allowing the central portion 24 being moved into the second brewing position when the cavity holds the second exchangeable capsule. Especially in this regard, the central portion 32 may be movable from a ready position to a second brewing position when the cavity 24 holds the second exchangeable capsule 4B and/or may be movable from a ready position to the first brewing position when the cavity 24 holds the second exchangeable capsule 4B and/or the first exchangeable capsule 4A.

Figure 5A:
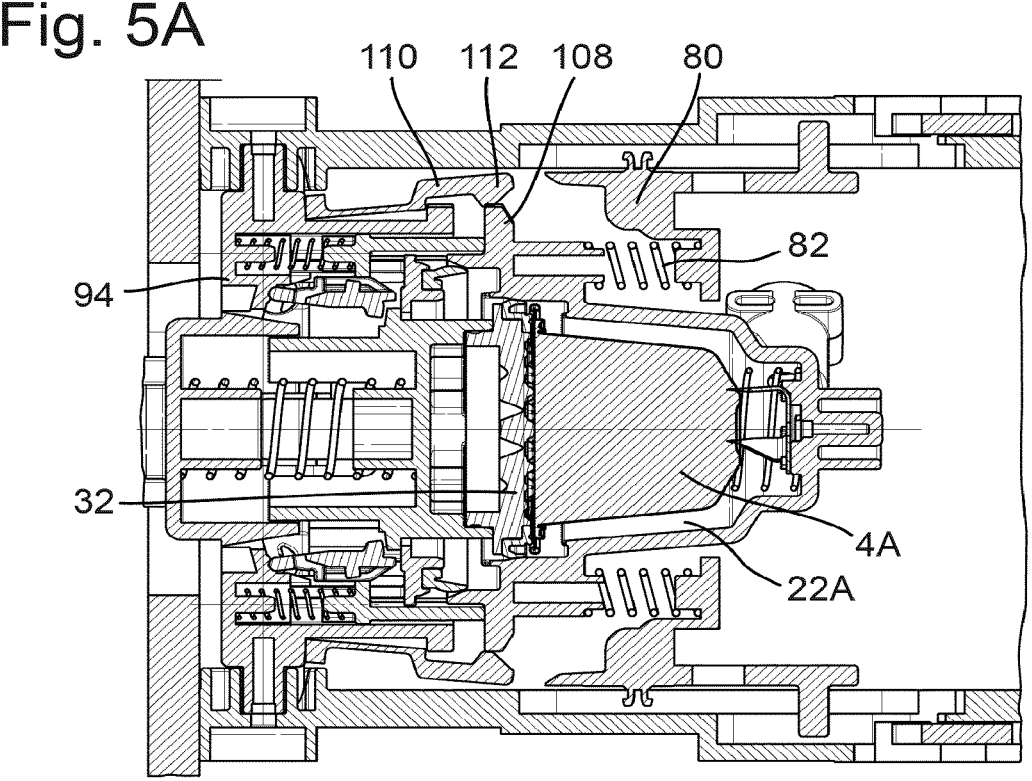
FIGS. 5a to 5c show a schematic representation of the system of FIG. 1 and a locking process of a first brew chamber part relative to a second brew chamber part.
Figure 5B:
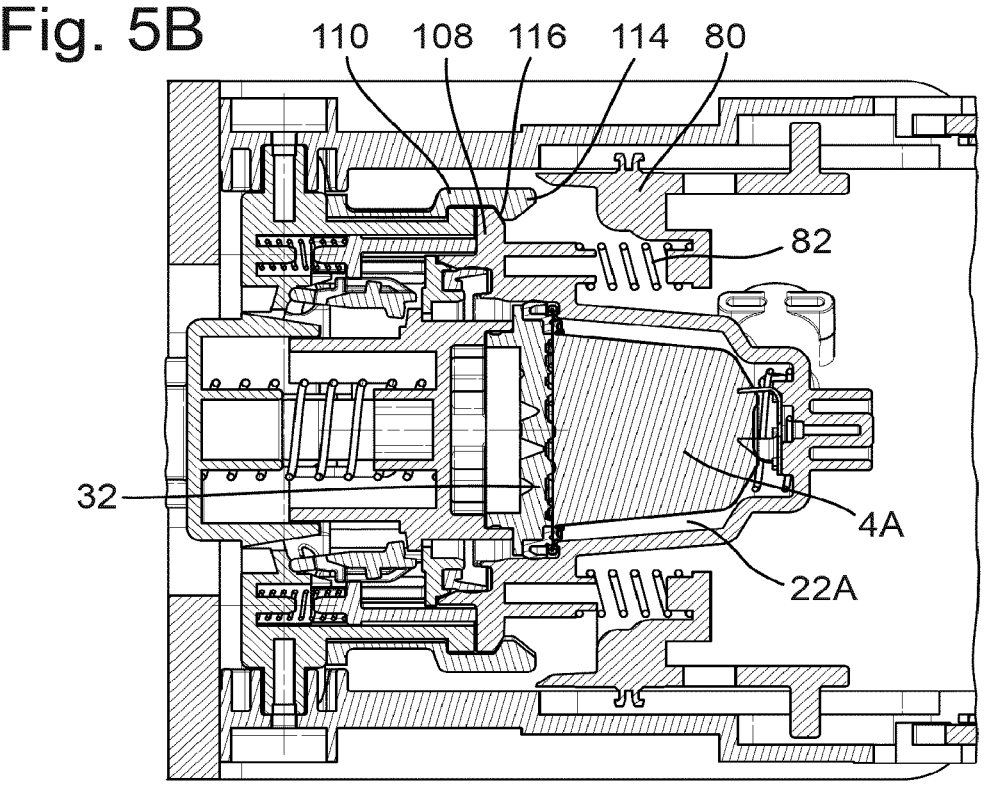
Figure 5C:
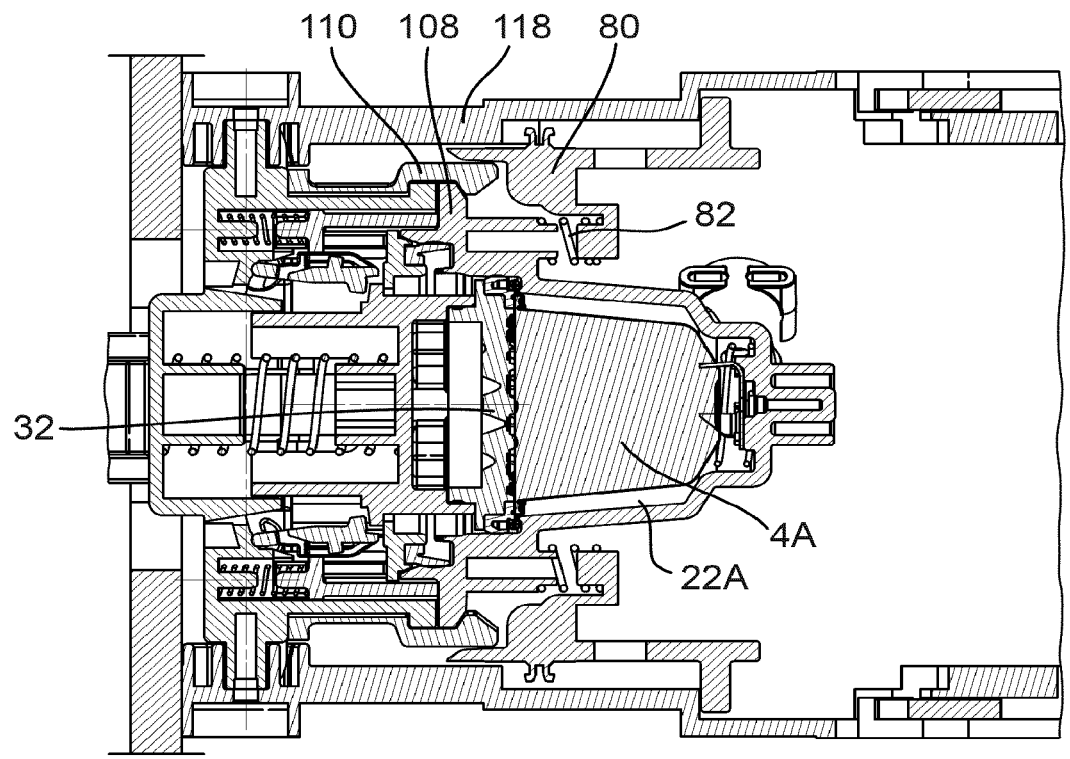

As mentioned above, the knee joint 62 may be indirectly connected to the first brew chamber part 18, viz. via the arresting ring 80 and one or more resilient elements 82. FIGS. 5A-5C demonstrate functioning of the arresting ring 80, which can be optionally be provided with the system and apparatus respectively explained herein. In principle the concept of this arresting ring 80 can be used with any kind of beverage preparation apparatus having a first brew chamber part movable relative to a second brew chamber part for providing a brew chamber a capsule is surrounded by, for brewing a beverage product.

In FIG. 5A the first exchangeable capsule 4A abuts against the central portion 32 with the central portion in the first brewing position. The arresting ring 80 is still in the rearward position. It will be appreciated that the lever 58 will not yet have reached its end position. The first brew chamber part 18 may include a protrusion 108. Here the protrusion 108 is a substantially annular protrusion. The protrusion 108 may extend outwardly. Here the protrusion 108 forms an outermost edge of the first brew chamber part 18. The second brew chamber part 20 may include a retainer 110. Here the retainer 110 is designed as a circumferential ring of retainer lips. The retainer 110 may be pivotally connected to the body 94. Here the retainer 110 is resiliently pivotally connected to the body 94. The retainer 110 may include a tooth 112. The tooth here has a first inclined surface 114 and a second inclined surface 116.

When moving and especially here lowering the lever 58, the arresting ring 80 will be advanced towards the second brew chamber part 20. The first brew chamber part 18 will be pushed, especially by one or more resilient elements 82, ahead of the arresting ring 80 until the first brew chamber part abuts against the second brew chamber 20 part, e.g. with the capsule 4A, 4B surround by the two parts and especially clamped in between. During this movement, the protrusion 108 may advance against the first inclined surface 114. This causes the retainer 110 to be pivoted outwardly (see FIG. 5A). Further advancing causes the protrusion 108 to pass beyond the second inclined surface 116, causing the retainer 110 to pivot inwardly (see FIG. 5B). Further moving and especially lowering of the lever 58, while the first brew chamber part abuts against the second brew chamber 20 part will cause the one or more resilient elements 82 to be compressed. As a result, the arresting ring 80 will advance towards the second brew chamber part 20. Fully lowering the lever 58 will cause the arresting ring 80 to be interposed between the retainer 110 and a locking ring 118 (see FIG. 5C). The arresting ring 80 surrounding the retainer 110 prevents the retainer 110 from pivoting outwardly. Hence, the first brew chamber part is locked with respect to the second brew chamber part 20. The first brew chamber part is locked onto the second brew chamber part 20.

The apparatus can include a fluid supply system for supplying a fluid, e.g. a liquid, such as hot water under pressure, to the first brew chamber part 18. When the brew chamber is pressurized with the fluid for brewing a beverage, the first and second brew chamber parts 18, 20 will be pushed away from each other by the fluid pressure. The retainer 110 and arresting ring 80, and optionally the locking ring 118, will bear all, or part of, the force exerted by the fluid pressure. The arresting ring 80 interposed between the retainer 110 and the locking ring 118 increases mechanical stability. The arresting ring 80 does not have to bear all forces exerted onto it by the retainer 110, since it can abut against the locking ring 118 and transmit at least part of the forces to the locking ring 118. The locking ring 118 can be immobile, and hence can easily be reinforced. Since the first brew chamber part is locked onto the second brew chamber part 20 the frame 48 and the actuation mechanism, e.g. the knee joint, do not have to bear this force, or at least a smaller part thereof. Hence the frame and/or the actuation mechanism can be designed weaker and/or cheaper.

Figure 6A:
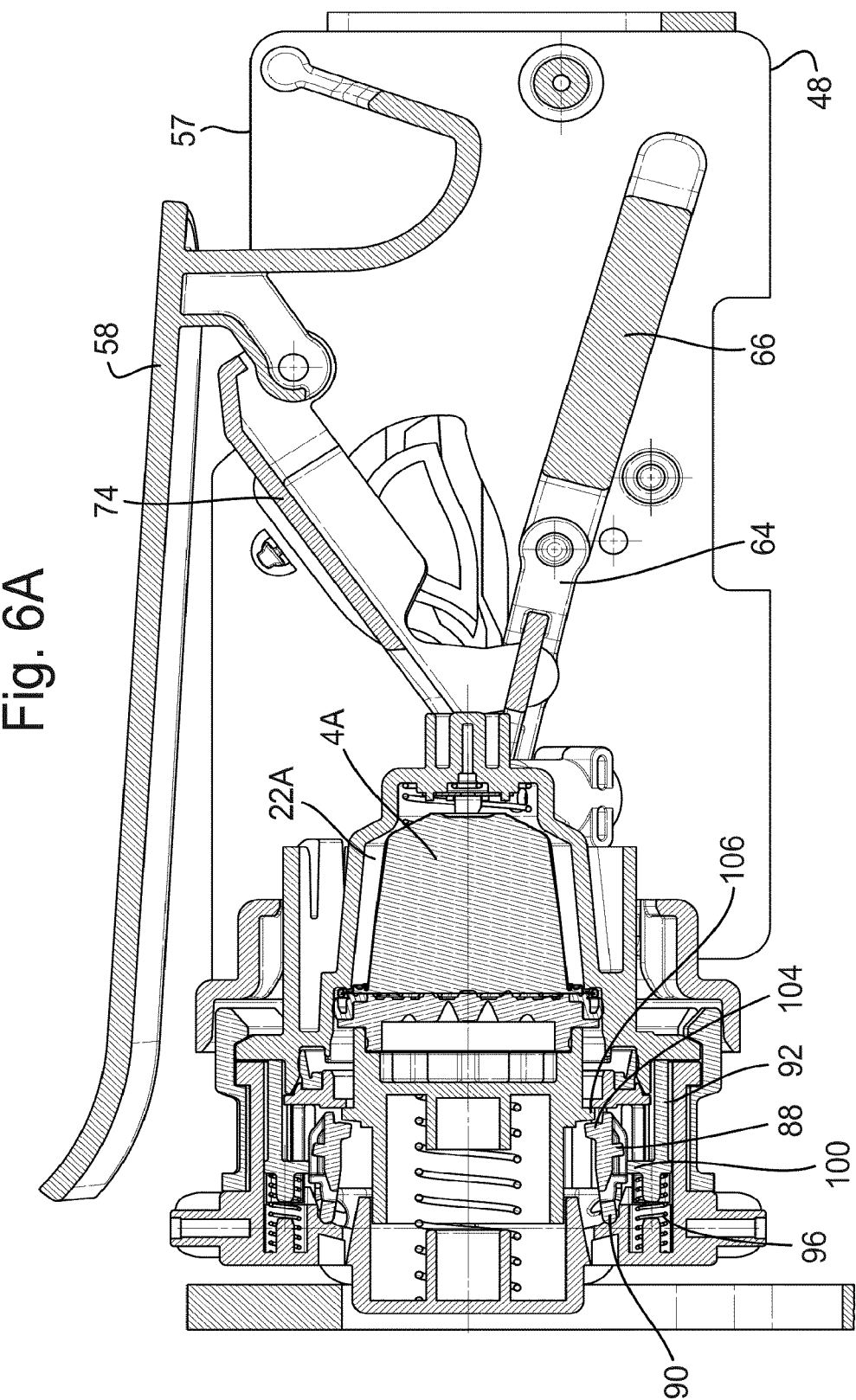
FIG. 6a shows a schematic representation of the system according to FIG. 1 with a first exchangeable capsule hold.
Figure 6B:
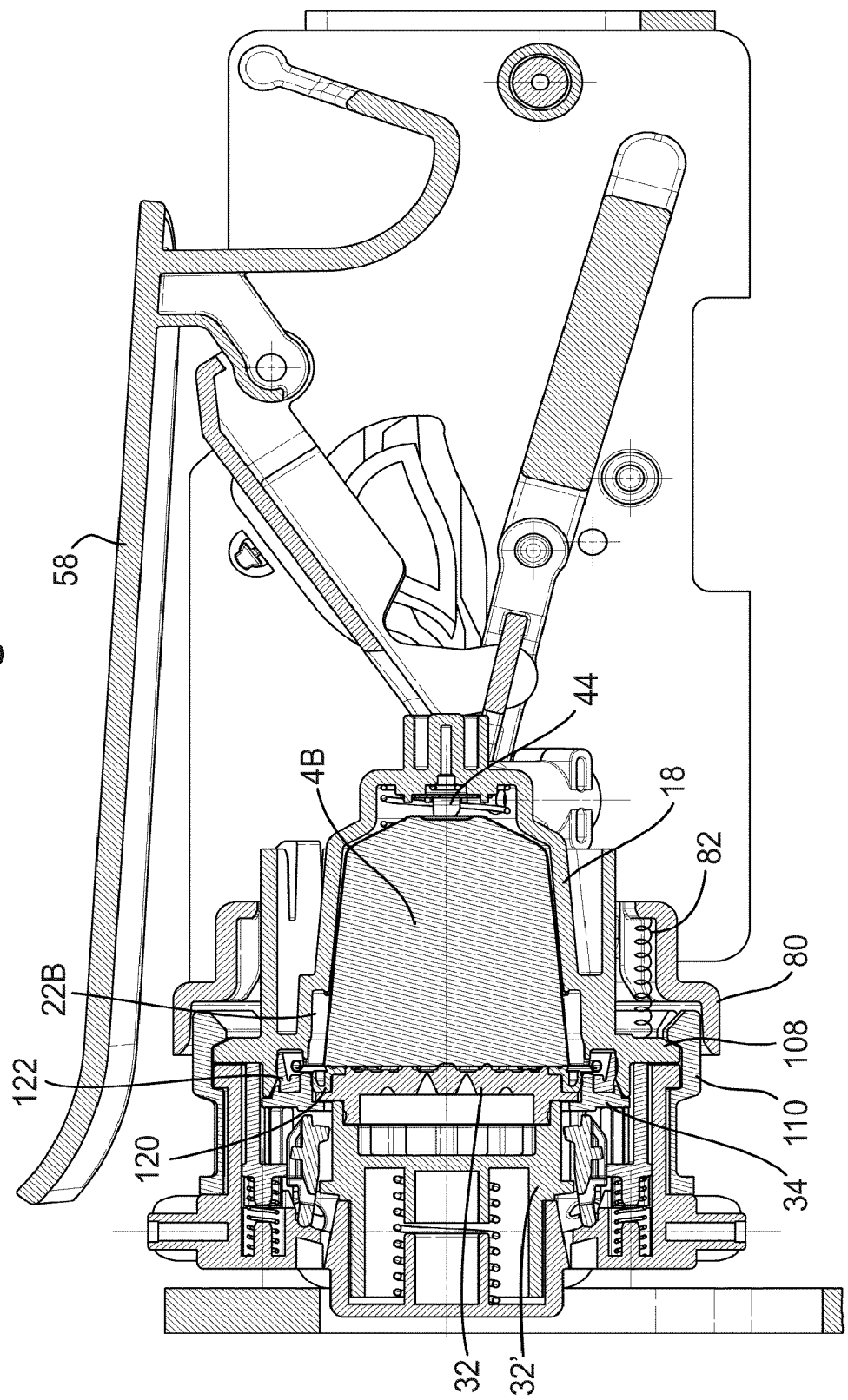
FIG. 6b shows a schematic representation of the system according to FIG. 1 with a second exchangeable capsule hold.

Although the functioning of the arresting ring 80 has been shown in FIGS. 5A-5C with respect to the first exchangeable capsule 4A, it will be appreciated that the arresting ring 80 can function identically with respect to the second exchangeable capsule 4B. FIG. 6A shows the first exchangeable capsule 4A in the brew chamber during extraction. FIG. 6B shows the second exchangeable capsule 4B in the brew chamber during extraction.

The piercing member 44 may be arranged for piercing the bottom 8A, 8B of the capsule 4A, 4B. As can also be seen in FIGS. 5A-5C, in this example the piercing member 44 does not pierce the bottom 8A, 8B until the exit face 12A, 12B of the capsule 4A, 4B abuts against the central portion 32 in the first or second brewing position. Thereto, stiffnesses of the resilient element 42 and the resilient member 84 can be chosen. In this example, the stiffness of the resilient element 42 is chosen to be larger than the stiffness of the resilient member 84. However, it will be appreciated that it is also possible that the stiffness of the resilient element 42 is equal to the stiffness of the resilient member 84 or that the stiffness of the resilient element 42 is smaller than the stiffness of the resilient member 84.

Once the capsule 4A, 4B is included in the brew chamber, and the bottom 8A, 8B has been pierced, a fluid, in this example hot water under pressure, can be supplied to the brew chamber. Therefore it is desired that the brew chamber is leak tight. Thereto the central portion 32 may be provided with a first sealing member 120. The peripheral portion 34 may be provided with a second sealing member 122. The beverage preparation apparatus 2 is arranged for preparing a quantity of a beverage, suitable for consumption, using either a first exchangeable capsule 4A or a second exchangeable capsule 4B. The quantity can be a predetermined quantity. The quantity can also be a user selectable, user settable, or user programmable quantity.

Referring to FIG. 3B sealing in view of the first exchangeable capsule 4A is described. The first sealing member 120 may be arranged for providing a fluid sealing engagement between the central portion 32 and the first brew chamber 18 part when forming the brew chamber for holding the first exchangeable capsule 4A. In this example, the first sealing member 120 abuts against the first brew chamber part 18 when the first exchangeable capsule 4A is included in the brew chamber. This provides a seal for water being present in the cavity 24 outside the capsule 4A. This way, brewing fluid injected into the brew chamber 22A is prevented from bypassing around the outside of the capsule 4A. In the example of FIG. 3B the first sealing member 120 may include a resilient lip 121. The resilient lip 121 may be arranged to provide a self-reinforcing sealing engagement between the central portion 32 and the first brew chamber part 18 under the effect of fluid pressure in the brew chamber. In this example the first sealing member 120 abuts against the rim 14A of the first exchangeable capsule 4A. The rim 14A is pressed against the first sealing member 120 by the first abutment surface 26. This may provide a sealing engagement between the central portion 32 and the capsule 4A against beverage exiting the capsule 4A via the exit area 13A. It will be appreciated that here the side of the rim 14A facing away from the cup-shaped body 6A, which rim may or may not be covered by a lid, for example by a foil, is sealed against the second brew chamber part 20. Alternatively, or additionally, the side of the rim 14A facing towards the cup-shaped body 6A can be sealed against the first brew chamber part 18. Thereto an additional seal can be provided on the first brew chamber part 18, e.g. on the first abutment surface 26, and/or on the capsule 4A, e.g. on the rim 14A. It will be clear that a seal on the capsule may be additional to the seal between the first brew chamber part 18 and the second brew chamber part 20. This may reduce the sealing effort by the first sealing member 120.

Referring to FIG. 4B sealing in view of the second exchangeable capsule 4B is described. The second sealing member 122 may be arranged for providing a fluid sealing engagement between the peripheral portion 34 and the first brew chamber 18 part when forming the brew chamber for holding the second exchangeable capsule 4B. In this example, the second sealing member 122 abuts against the first brew chamber part 18 when the second exchangeable capsule 4B is included in the brew chamber. This provides a seal for water being present in the cavity 24 outside the capsule 4B. In the example of FIG. 3B the second sealing member 122 includes a resilient lip 123. The resilient lip 123 may be arranged to provide a self-reinforcing sealing engagement between the peripheral portion 34 and the first brew chamber part 18 under the effect of fluid pressure in the brew chamber. In this example the second sealing member 122 abuts against the rim 14B of the second exchangeable capsule 4B. The rim 14B is pressed against the second sealing member 122 by the second abutment surface 28. This may provide a sealing engagement between the peripheral portion 34 and the capsule 4B against beverage exiting the capsule 4B via the exit area 13B.

In FIG. 4B the first sealing member 120 provides a sealing engagement between the central portion 32 and the peripheral portion 34 when forming the brew chamber for holding the second exchangeable capsule 4B. This sealing engagement between the central portion 32 and the peripheral portion 34 can be self-reinforcing. Thereto the engagement between peripheral portion 34 and the second capsule 4B may allow brewing fluid to pass to the first sealing member 120. Hence, the first sealing member 120 provides a sealing engagement between the central portion 32 and the capsule 4B against beverage exiting the capsule 4B via the exit area 13B. It will be appreciated that here the side of the rim 14B facing away from the cup-shaped body 6B, which rim may or may not be covered by a lid, for example by a foil, is sealed against the second brew chamber part 20. Alternatively, or additionally, the side of the rim 14B facing towards the cup-shaped body 6B can be sealed against the first brew chamber part 18. Thereto an additional seal can be provided on the first brew chamber part 18, e.g. on the second abutment surface 28, and/or on the capsule 4B, e.g. on the rim 14B. It will be clear that a seal on the capsule may be additional to the seal between the first brew chamber part 18 and the second brew chamber part 20. This may reduce the sealing effort by the second sealing member 122.

When the fluid under pressure is supplied to the capsule 4A, 4B in the brew chamber, the exit area 13A, 13B may open against the extraction plate 30. The extraction plate 30 in this example includes a plurality of relief elements 124. Here the relief elements 124 are truncated pyramids. A rise in pressure inside the capsule 4A, 4B can cause the exit area 13A, 13B to tear against the relief elements allowing beverage to exit the capsule 4A, 4B.

The beverage can pass through the extraction plate 30 via apertures in the extraction plate. Next the beverage can flow to an outlet 126. From the outlet 126 the beverage can flow into a receptacle, such as a cup.

Once the beverage has been brewed, the lever 58 can be moved upwardly. This causes the arresting ring 80 to be moved away from the retainer 110. Next, the first brew chamber part 18 will be moved rearwardly. The second inclined surface 116 of the retainer 110 can allow the retainer to pass the projection 108. The first brew chamber 18 part will move away from the second brew chamber part 20. The central portion 32 will return to the ready position. The bosses 50, 52 and grooves 54, 56 determine the path that will be followed by the first brew chamber part 18.

Figure 7B:
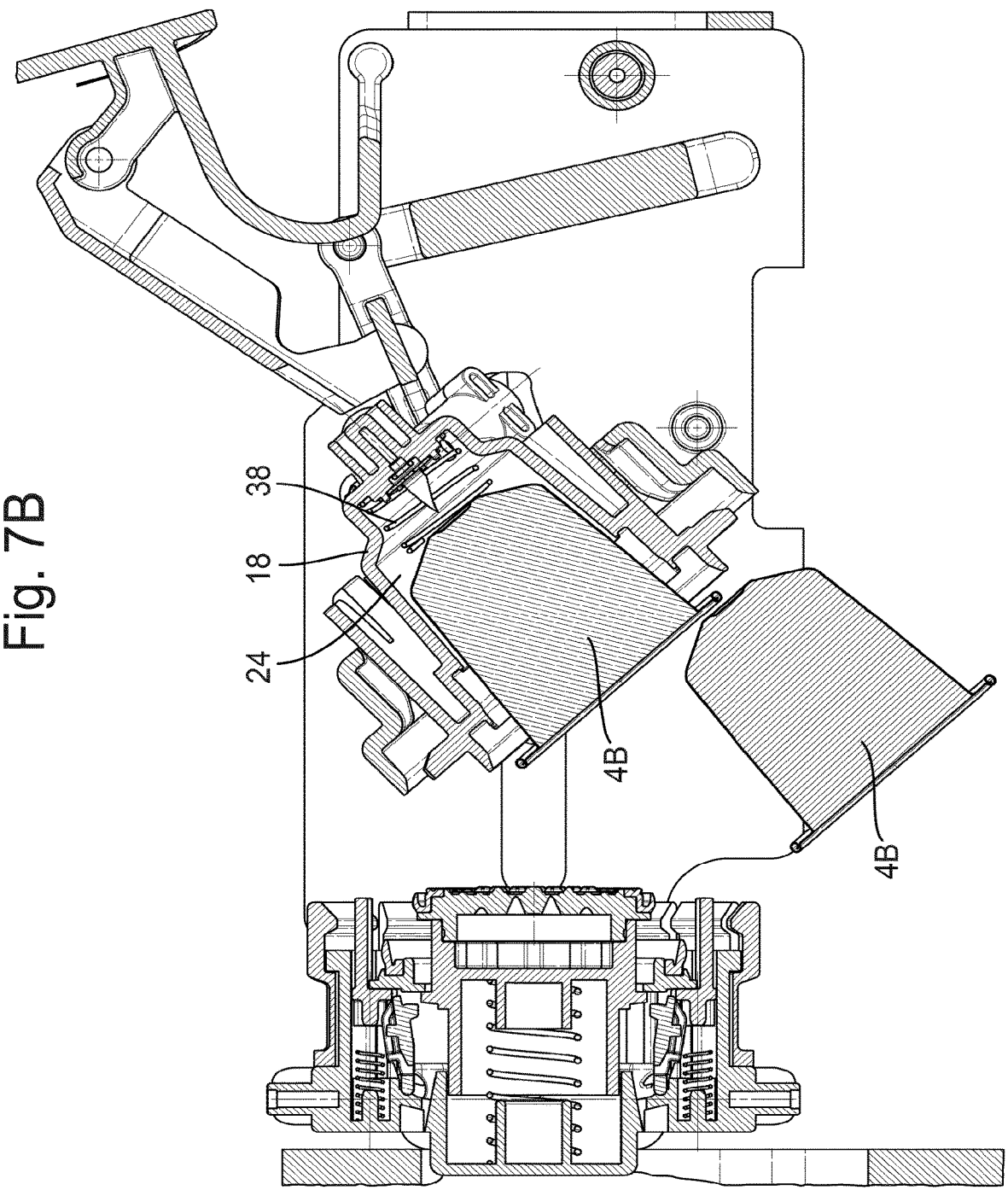
FIG. 7b shows a schematic representation of a side view of the embodiment of FIG. 1 during ejection of a second exchangeable capsule.

As shown in FIGS. 7A and 7B the first brew chamber part will swivel downwardly. This promotes ejection of the used capsule 4A, 4B from the cavity 24 under the effect of gravity. The ejector 38 can assist in pushing the capsule 4A, 4B off the piercing member 44 and out of the cavity 24. The used capsule 4A, 4B can fall into a waste basket of the apparatus 2.

In this example the first and second exchangeable capsules 4A, 4B are designed to make a similar visual impression.

Figure 8A:
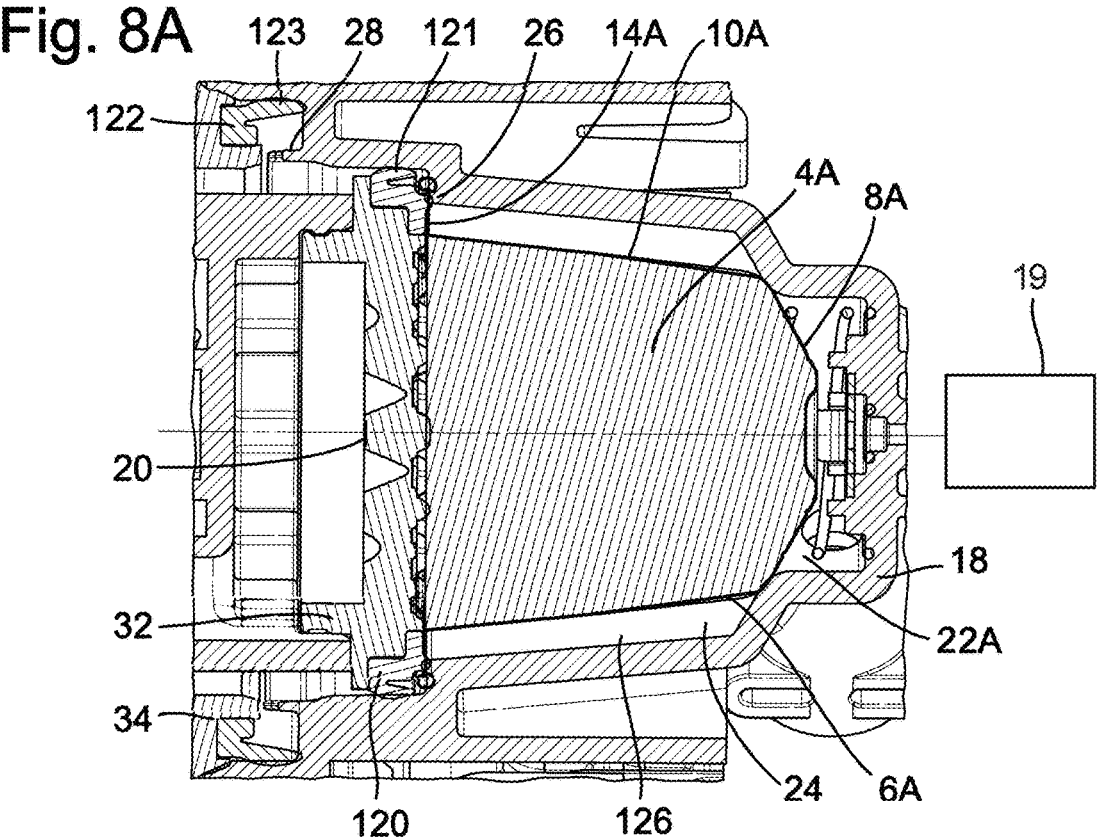
FIG. 8a shows a schematic representation of a side view of a first brew chamber part holding a first exchangeable capsule and FIG. 8b shows a schematic representation of a side view of a first brew chamber part holding a second exchangeable capsule.

FIG. 8A shows an example of a first exchangeable capsule 4A inserted in the brew chamber 22A formed by the first brew chamber part 18 and the second brew chamber part 20. It will be appreciated that the circumferential wall 10A is narrower than the cavity 24 at that location. As a result there is a first volume 126 surrounding the first exchangeable capsule 4A inside the cavity 24.

Figure 8B:
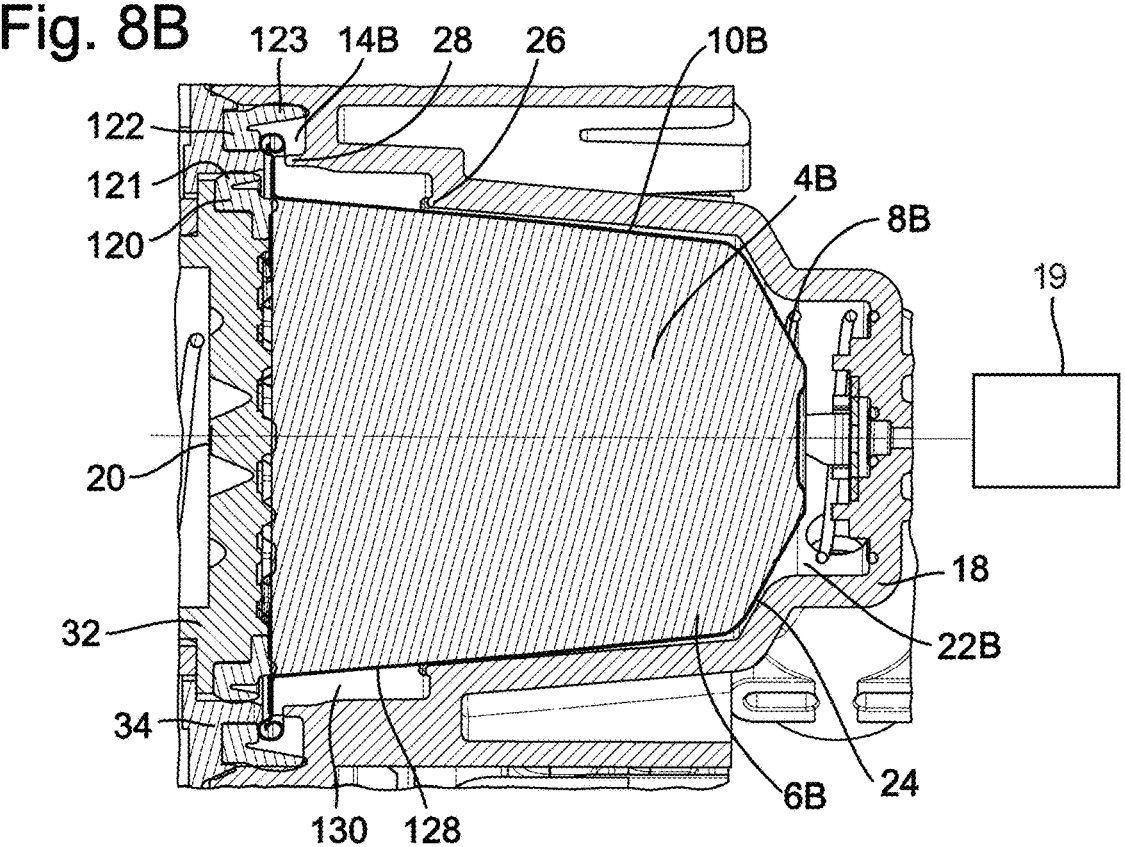

FIG. 8B shows an example of a second exchangeable capsule 4B inserted in the brew chamber 22B formed by the first brew chamber part 18 and the second brew chamber part 20. It will be appreciated that a part 128 of the circumferential wall 10B is narrower than the cavity 24 at that location. This part 128 is formed by the part of the circumferential wall 10B extending beyond the first abutment surface 26. As a result there is a second volume 130 surrounding the second exchangeable capsule 4B inside the cavity 24.

It is noted that the first volume 126 is not occupied by the first exchangeable capsule 4A when the brew chamber holds the first exchangeable capsule 4A. However, this first volume 126 is occupied by part of the second exchangeable capsule 4B when the brew chamber holds the second exchangeable capsule 4B. The second volume 130 is not occupied by the second exchangeable capsule 4B when the brew chamber holds the second exchangeable capsule 4B. This second volume 130 receiving the central portion 32 of the extraction plate 30 when the brew chamber holds the first exchangeable capsule 4A.

When brewing a beverage using the first exchangeable capsule 4A, the first volume 126 will fill with fluid, such as water, which fluid is not used for brewing the beverage. This fluid can be drained to the waste basket after brewing. When brewing a beverage using the second exchangeable capsule 4B, the second volume 130 will fill with fluid, such as water, which fluid is not used for brewing the beverage. This fluid can be drained to a container, e.g. the waste basket, after brewing. In this example the first volume 126 is substantially equal to the second volume 130. Hence, the volume of fluid directed to the waste basket is substantially equal when brewing a beverage using a first exchangeable capsule 4A and when brewing a beverage using a second exchangeable capsule 4B.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

In the examples, the central portion of the extraction plate includes a plurality of relief elements. The peripheral portion includes no relief elements. However, it will be appreciated that the peripheral portion may also include relief elements. The extraction plate and the second exit area can be adapted to each other such that a flow resistance of the second exit area when opened is less than a flow resistance of the first exit area when opened or vice versa. The extraction plate and the second exit area may be adapted to each other such that the second exit area tears on the extraction plate over a larger surface area than the first exit area or vice versa. The extraction plate and the second exit area may be adapted to each other such that the second exit area tears on the extraction plate on more locations than the first exit area. This also applies for the first exit area. Outer relief elements may be designed for tearing both the first and second exit area wherein the second exit area tears on the outer relief elements over a larger surface area than the first exit area. The extraction plate can include relief elements of a first type and at least one relief element of a second type, wherein the relief elements of the first type are arranged within an area corresponding to the first exit area, and the at least one relief element of the second type being arranged within an area corresponding to the second exit area and outside the area corresponding to the first exit area. The relief element of the second type may have a sharper edge than the relief elements of the first type. The second exit area may include a weakened zone. The weakened zone may be located in a peripheral area of the second exit area.

In the examples, the first and second exchangeable capsules have substantially the same shape. It is also possible to provide a third capsule having a different shape. The third capsule can e.g. be shaped to substantially fill the brew chamber when the central portion is in the first extraction position. It is also possible to provide a fourth capsule having a different shape and so on. The fourth capsule can e.g. be shaped to substantially fill the brew chamber when the central portion is in the second extraction position.

In the examples, the first exchangeable capsule has an outwardly extending flange-like rim. It will be appreciated that it is possible that the first exchangeable capsule does not include an outwardly extending rim. In the examples, the second exchangeable capsule has an outwardly extending flange-like rim. It will be appreciated that it is possible that the second exchangeable capsule does not include an outwardly extending rim.

In the examples, the capsule body and exit face, and especially a lid, are made of aluminium foil, preferable polymer coated aluminium foil to allow easy welding of the exit face to the body. It will be appreciated that the capsule body and/or exit face can be made of a wide variety of materials considered suitable by the skilled person and capable of being processed into a sheet, film or foil using techniques conventionally known in the art such as extrusion, co-extrusion, injection molding, blow molding, vacuum forming, etc. Suitable materials for the capsule body and/or exit face include, without being limited thereto, plastic materials, in particular thermoplastic materials, for example a polyolefin polymer, for example polyethylene or polypropylene, PVC, polyesters for example polyethylene terephthalate (PET); metal foils such as aluminum, stainless steel, metal alloys, etc.; or sheets of a woven or a non-woven or otherwise processed fibrous material, like paper, polyester, etc.; or combinations thereof, e.g. multilayers. The material for the capsule can be a biodegradable polymer or another biodegradable material. The skilled person will be capable of selecting the appropriate material taking into account the envisaged use with food material and any other relevant circumstances during use of the capsule. The thickness of the sheet or foil may be chosen such that a form stable capsule is provided. The thickness of the sheet or foil may vary with the nature of the material.

In the examples, the capsules are closed capsules. It is also possible to provide the system with an open capsule. The open capsule is open prior to insertion into the apparatus. The open capsule can be pre-perforated. The open capsule can be packaged in a hermetically sealed package which has to be removed before inserting the open capsule in the apparatus. In the examples, the capsules are pierced by the piercing means. It is also possible to provide the system with a capsule that is not pierced by the piercing means. Such capsule can e.g. include an entrance filter. In the examples, the capsules open against the extraction plate. It is also possible to provide the system with a capsule that does not open against the extraction plate. Such capsule can e.g. include an exit filter.

In the examples, the capsules themselves do not include a sealing member. It will be appreciated that it is possible to provide the capsule with a sealing member, e.g. a resilient and/or plastically deforming sealing member. The sealing member can e.g. be placed on the rim, e.g. on the side facing towards the cup-shaped body or on the side facing away from the cup-shaped body. Alternatively, or additionally, a sealing member can be provided on the circumferential wall and/or on the bottom.

In the examples the arresting ring and retainer extend along substantially the entire perimeter of the first and second brew chamber parts. This provides particular good locking of the two brew chamber parts onto each other. However, it will be appreciated that it is also possible that the arresting ring and retainer include arresting means and retaining means at one or more discrete positions along the perimeter, e.g. at two, three, four, six or eight positions.

It will be appreciated that it is also possible to provide a first apparatus arranged for brewing a beverage using a first exchangeable capsule, but incapable of brewing a beverage using a second exchangeable capsule. Such first apparatus can be included in a system with the apparatus as described in relation to the figures and a first exchangeable capsule and optionally a second exchangeable capsule.

It will be appreciated that it is also possible to provide a second apparatus arranged for brewing a beverage using a second exchangeable capsule, but incapable of brewing a beverage using a first exchangeable capsule. Such second apparatus can be included in a system with the apparatus as described in relation to the figures and a second exchangeable capsule and optionally a first exchangeable capsule.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A system for preparing a quantity of beverage suitable for consumption, the system comprising:
   a first exchangeable capsule comprising a first exit face and a second exchangeable capsule comprising a second exit face, the second exchangeable capsule having a larger diameter than the first exchangeable capsule, and an apparatus including a first brew chamber part, having a cavity for selectively holding one of the first exchangeable capsule or the second exchangeable capsule, and a second brew chamber part, having an extraction plate including a central portion and a peripheral portion that are movable relative to each other, the first and second brew chamber parts forming a brew chamber for selectively holding one of the first and second exchangeable capsules, and a fluid supply system for supplying an amount of fluid, such as water, under pressure to the first brew chamber part, wherein the central portion of the extraction plate is movable into a first brewing position and a second brewing position, wherein the first brew chamber part is movable between a loading position and a brewing position, wherein the first brew chamber part in the loading position together with the second brew chamber part defines an open position, in which the capsule can be inserted into the brew chamber, wherein the first brew chamber part in the brewing position together with the central portion of the extraction plate in the first brewing position defines a first closed position in which the first exchangeable capsule fits in the brew chamber, wherein the first brew chamber part in the brewing position together with the central portion of the extraction plate in the second brewing position defines a second closed position in which:

the second exchangeable capsule fits in the brew chamber, and the peripheral portion is arranged to abut against the second exit face.

2. The system according to claim 1, wherein the system includes a pivotable finger arranged for selectively locking the central portion of the extraction plate in the first brewing position.

3. The system according to claim 2, wherein the pivotable finger is arranged for selectively preventing the central portion being locked in the first brewing position when the second capsule is being loaded into the brew chamber.

4. The system according to claim 2, wherein the pivotable finger is arranged for selectively allowing the central portion being moved into the second brewing position when the second capsule is being loaded into the brew chamber.

5. The system according to claim 2, wherein the pivotable finger is arranged for selectively preventing the central portion being moved into the second brewing position when the first capsule is being loaded into the brew chamber.

6. The system according to claim 1, wherein an axial length of the second capsule is larger than an axial length of the first capsule.

7. The system according to claim 1, the second exchangeable capsule having a second body and a second exit face attached to the second body and the first exchangeable capsule having a first body and a first exit face attached to the first body, the second exit face having a larger diameter than the first exit face.

8. The system according to claim 1, wherein the central portion is biased to a ready position.

9. The system according to claim 2, further comprising an actuator for actuating the pivotable finger.

10. The system according to claim 9, wherein the pivotable finger is arranged such that it is actuated while closing the first brew chamber part against the second brew chamber part.

11. The system according to claim 9, arranged such that when the cavity holds the first exchangeable capsule, the first exchangeable capsule is recessed into the cavity further than the second exchangeable when the cavity holds the second exchangeable capsule.

12. The system according to claim 1, wherein the second exchangeable capsule is arranged for moving the central portion from the first brewing position to the second brewing position.

13. The system according to claim 11, wherein the system is arranged such that, while closing the first brew chamber part against the second brew chamber part, when the cavity holds the second exchangeable capsule, central portion is pushed beyond the pivotable finger by the second exchangeable capsule before the pivotable finger is actuated by the first brew chamber part.

14. The system according to claim 11, wherein the system is arranged such that, while closing the first brew chamber part against the second brew chamber part, when the cavity holds the first exchangeable capsule, the pivotable finger is actuated by the first brew chamber part before the central portion is pushed beyond the pivotable finger by the first exchangeable capsule.

15. The system according to claim 9, wherein the pivotable finger is actuated by the actuator during the movement of the first brew chamber part.

16. The system according to claim 15, wherein a movable pusher is arranged to be moved by the actuator during closing of the first brew chamber part for translating the pivotable finger from an unlocking position into a locking position for locking the central portion in the first brewing position.

17. The system according to claim 15, wherein the actuator is arranged in such a way that, seen in a direction towards the second brew chamber part, that, when the cavity holds the first exchangeable capsule, the outermost part of the first exchangeable capsule is positioned rearwardly relative to the actuator and, when the cavity holds the second exchangeable capsule, the outermost part of the second exchangeable capsule is positioned frontwards relative to the actuator, so that the pivotable finger is actuated by the actuator of the first brew chamber part before the central portion is pushed beyond the pivotable finger by the first exchangeable capsule or the pivotable finger is actuated by the first brew chamber part after the central portion is pushed beyond the pivotable finger by the second exchangeable capsule respectively.

18. The system according to claim 1, wherein the first brew chamber part has a first annular abutment surface in the cavity and a second annular abutment surface, wherein the first abutment surface is arranged for abutting the first exchangeable capsule there against when the cavity holds the first exchangeable capsule, and wherein the second abutment surface is arranged for abutting the second exchangeable capsule there against when the cavity holds the second exchangeable capsule, wherein the first annular abutment surface is spaced from the second annular abutment surface in an axial direction of the first brew chamber part, and wherein the first annular abutment surface and the second annular abutment surface are immobile relative to each other.

19. The system according to claim 18, wherein the second annular abutment surface is arranged at an open end of the cavity.

20. An apparatus for preparing a quantity of beverage suitable for consumption, the apparatus comprising:

a first brew chamber part, having a cavity for selectively holding one of a first exchangeable capsule or a second exchangeable capsule, and a second brew chamber part, having an extraction plate including a central portion and a peripheral portion that are movable relative to each other, the first and second brew chamber parts forming a brew chamber for selectively holding one of the first and the second exchangeable capsules, and a fluid supply system for supplying an amount of fluid, such as water, under pressure to the first brew chamber part, wherein the central portion of the extraction plate is movable into a first central portion brewing position and a second central portion brewing position, wherein the first brew chamber part is movable between a loading position and a brew chamber part brewing position, wherein the first brew chamber part in the loading position together with the second brew chamber part defines an open position in which the capsule can be inserted into the brew chamber, wherein the first brew chamber part in the brew chamber part brewing position together with the central portion of the extraction plate in the first central portion brewing position defines a first closed position in which the first exchangeable capsule fits in the brew chamber, wherein the first brew chamber part in the brew chamber part brewing position together with the central portion of the extraction plate in the second central portion brewing position defines a second closed position in which the second exchangeable capsule fits in the brew chamber, and wherein the central portion of the extraction plate is arranged with relief elements for opening the first exchangeable capsule or the second exchangeable capsule during the preparation of the quantity of beverage.

21. An apparatus for preparing a quantity of beverage suitable for consumption, the apparatus comprising:

a first brew chamber part, having a cavity for selectively holding one of the first exchangeable capsule or the second exchangeable capsule, and a second brew chamber part, having an extraction plate including a central portion and a peripheral portion that are movable relative to each other, the first and second brew chamber parts forming a brew chamber for selectively holding one of a first and a second exchangeable capsules, and a fluid supply system for supplying an amount of fluid, such as water, under pressure to the first brew chamber part, wherein the central portion of the extraction plate is movable into a first central portion brewing position and a second central portion brewing position, wherein the first brew chamber part is movable between a loading position and a brew chamber part brewing position, wherein the first brew chamber part in the loading position together with the second brew chamber part defines an open position in which the capsule can be inserted into the brew chamber, wherein the first brew chamber part in the brew chamber part brewing position together with the central portion of the extraction plate in the first central portion brewing position defines a first closed position in which the first exchangeable capsule fits in the brew chamber, and wherein the first brew chamber part in the brew chamber part brewing position together with the central portion of the extraction plate in the second central portion brewing position defines a second closed position in which the second exchangeable capsule fits in the brew chamber, and in which second central portion brewing position the central portion is arranged such that the central portion provides a coplanar plane with a plane of the peripheral portion.

* * * * *